(12) United States Patent
Spirkl et al.

(10) Patent No.: US 11,349,526 B2
(45) Date of Patent: *May 31, 2022

(54) PRE-DISTORTION FOR MULTI-LEVEL SIGNALING

(71) Applicant: Micron Technology, Inc., Boise, ID (US)

(72) Inventors: Wolfgang Anton Spirkl, Germering (DE); Michael Dieter Richter, Ottobrunn (DE); Martin Brox, Munich (DE); Peter Mayer, Neubiberg (DE); Thomas Hein, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/078,812

(22) Filed: Oct. 23, 2020

(65) Prior Publication Data

US 2021/0083720 A1 Mar. 18, 2021

Related U.S. Application Data

(63) Continuation of application No. 16/538,301, filed on Aug. 12, 2019, now Pat. No. 10,840,971.

(Continued)

(51) Int. Cl.
*H04L 25/49* (2006.01)
*H04B 3/487* (2015.01)
(Continued)

(52) U.S. Cl.
CPC ........... *H04B 3/487* (2015.01); *H04B 1/0475* (2013.01); *H04B 3/32* (2013.01); *H04L 25/4917* (2013.01)

(58) Field of Classification Search
CPC ........ H04B 3/487; H04B 1/0475; H04B 3/32; H04L 25/4917

(Continued)

(56) References Cited

U.S. PATENT DOCUMENTS 5,887,032 A * 3/1999 Cioffi ....................... H04B 3/32
375/257
7,269,212 B1 9/2007 Chau et al.
(Continued)

FOREIGN PATENT DOCUMENTS

EP 1410588 A2 4/2004
KR 201100607 59 A 6/2011
WO 9810528 A1 3/1998

OTHER PUBLICATIONS

ISA/KR, International Search Report and Written Opinion of the International Searching Authority, Int'l. Appl. No. PCT/US2019/046406, dated Dec. 2, 2019, Korean Intellectual Property Office, Seo-gu, Daejeon, Republic of Korea, 13 pgs.

(Continued)

*Primary Examiner* — Aristocratis Fotakis
(74) *Attorney, Agent, or Firm* — Holland & Hart LLP

(57) ABSTRACT

Methods, systems, and devices for pre-distortion of multi-level signaling are described. A device may identify two multi-level signals that are to be transmitted over two transmission lines at the same time. The device may estimate the crosstalk expected to be caused by one of the multi-level signals on the other during propagation. Based on the expected crosstalk, the device may generate a signal that compensates for the expected crosstalk. In some examples, the signal may be a combination of the first signal and a cancelation signal. In some examples, once the compensated signal has been generated, it is transmitted over its respec- (Continued)

tive transmission line at the same time that the other multi-level is transmitted over its respective transmission line.

18 Claims, 9 Drawing Sheets

Related U.S. Application Data

(60) Provisional application No. 62/720,813, filed on Aug. 21, 2018.

(51) Int. Cl.
*H04B 1/04* (2006.01)
*H04B 3/32* (2006.01)

(58) Field of Classification Search
USPC ............... 375/285, 286, 287, 296, 256, 257
See application file for complete search history.

(56) References Cited

U.S. PATENT DOCUMENTS

| | | | |
|---|---|---|---|
| 8,605,566 B2 | 12/2013 | Schmukler et al. | |
| 9,166,650 B2* | 10/2015 | Wilson | H04B 3/32 |
| 9,559,880 B1* | 1/2017 | Cirit | H04L 25/08 |
| 2002/0181050 A1* | 12/2002 | Drost | H04L 5/14 |
| | | | 375/219 |
| 2003/0070126 A1* | 4/2003 | Werner | G11C 11/56 |
| | | | 714/715 |
| 2007/0014378 A1 | 1/2007 | Parhi et al. | |
| 2007/0081582 A1 | 4/2007 | Ginis et al. | |
| 2010/0321127 A1 | 12/2010 | Watanabe et al. | |
| 2012/0257691 A1 | 10/2012 | Ginis et al. | |
| 2013/0009686 A1 | 1/2013 | Bucher et al. | |
| 2014/0029406 A1 | 1/2014 | Liang et al. | |
| 2014/0153629 A1 | 6/2014 | Gao et al. | |
| 2015/0071651 A1* | 3/2015 | Asmanis | H04B 10/54 |
| | | | 398/141 |
| 2018/0321519 A1 | 11/2018 | Nagarajan | |

OTHER PUBLICATIONS

European Patent Office, "Extended Search Report," issued in connection with European Patent Application No. 19851239.4, dated Nov. 11, 2021 (9 pages).

\* cited by examiner

PRE-DISTORTION FOR MULTI-LEVEL SIGNALING

CROSS REFERENCE

The present Application for Patent is a continuation of U.S. patent application Ser. No. 16/538,301 by Spirkl et al., entitled "PRE-DISTORTION FOR MULTI-LEVEL SIGNALING," filed Aug. 12, 2019, now issued U.S. Pat. No. 10,840,971, which claims priority to U.S. Provisional Patent Application No. 62/720,813 by Spirkl et al., entitled "PRE-DISTORTION FOR MULTILEVEL SIGNALING" filed Aug. 21, 2018, each of which is assigned to the assignee hereof and is expressly incorporated by reference in its entirety.

BACKGROUND

The following relates generally to a system that includes at least one memory device and more specifically to pre-distortion for multi-level signaling.

Memory devices are widely used to store information in various electronic devices such as computers, wireless communication devices, cameras, digital displays, and the like. Information is stored by programing different states of a memory device. For example, binary devices may store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state over time unless they are periodically refreshed by an external power source Non-binary modulation schemes, in which modulation symbols each represent more than one bit of information, may be referred to as multi-level modulation schemes and signaling techniques in accordance with such modulation schemes may be referred to as multi-level signaling. Some memory devices may use multi-level signaling to exchange information with other devices. Solutions for mitigating crosstalk or other forms of interference between transmission lines used for multi-level signaling may be desired.

DETAILED DESCRIPTION

Figure 1:
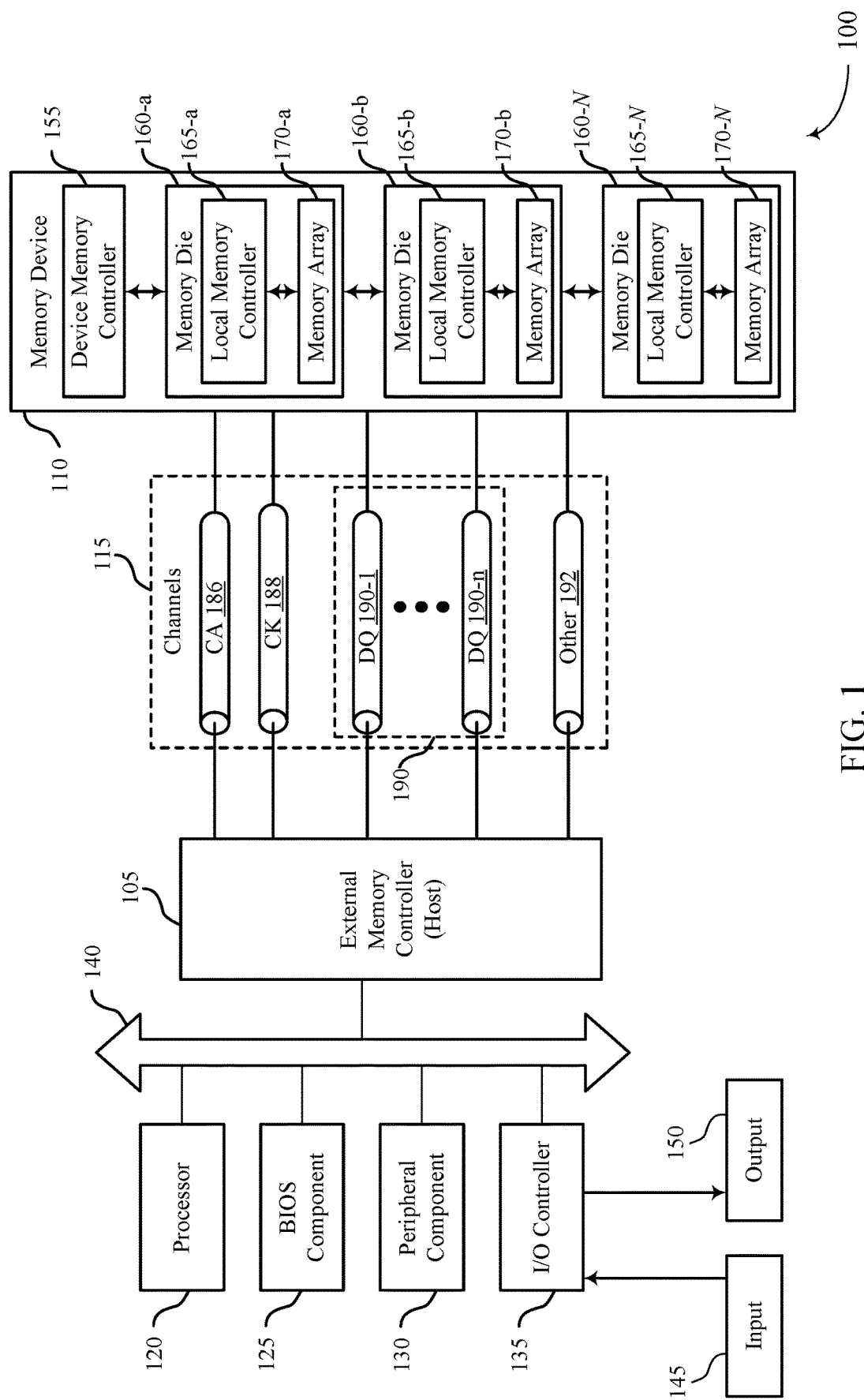
FIG. 1 illustrates an example of a memory device that supports a pre-distortion for multi-level signaling in accordance with examples of the present disclosure.

Devices employing multilevel signaling may dynamically mitigate crosstalk among transmission lines between a host and memory. Such mitigation may include crosstalk cancelation that is based on interference estimates applied before data transmissions.

By way of example, in some systems or devices, data to be stored or data retrieved from storage is exchanged between a processing unit (e.g., a graphics processing unit (GPU), general purpose GPU (GPGPU), central processing unit (CPU)) and a memory device (e.g., DRAM) via one or more transmission lines. But in some cases the proximity of the transmission lines results in undesired contributions (e.g., interference) to some data signals during propagation. For example, crosstalk may arise when multiple signals are sent concurrently over closely spaced transmissions lines. Such crosstalk, which may also be referred to as cross coupling, may adversely affect or corrupt the signal and result in one or more data errors at the device receiving the signal, and thus may result in incorrect data being stored or interpreted as having been retrieved—thereby negatively impacting performance.

Because crosstalk increases with reduced spacing between transmission lines, a device's performance may suffer as the quantity of input/outputs (I/Os) increases or the proximity of I/Os increases. This issue may be exacerbated if those I/Os use single-ended transmission lines which, unlike differential lines, do not inherently mitigate crosstalk.

If a multi-level modulation scheme (e.g., a modulation scheme that includes at least three levels to encode more than one bit of information per modulation symbol, such as pulse-amplitude modulation 4 (PAM4)) is used to send multi-level signals across the single-ended transmissions lines, the crosstalk contributions may be further exacerbated. For example, assuming a constant differential between minimum and maximum voltage levels (e.g., a constant differential between a positive supply voltage and a negative supply voltage or ground reference), as the number of voltage levels in a modulation scheme increases, the sense window between different voltage levels (symbols) decreases, and thus the magnitude of a crosstalk-induced voltage that may cause an error also decreases. As a specific example, because the voltage swing between the voltage levels in PAM4 is one-third that of the voltage swing for PAM2 (assuming the same overall swing between the highest and lowest voltage levels), crosstalk may be three times worse for PAM4 signals than PAM2 signals.

Before sending data signals over transmission lines, a device may compensate for crosstalk that may arise from the transmission of the signals (e.g., concurrent transmission). For example, before sending a signal, the device may estimate the crosstalk contributions from other signals that are to be sent over neighboring transmission lines during the same time. Once the device determines the crosstalk contributions, the device may compensate for the effects of the contributions (e.g., by adding a cancelation signal to the signal that would be subject to the crosstalk). The signal to which the cancelation signal is applied may be referred to as the victim signal or "victim." The signals for which the crosstalk contributions to the victim signal are calculated may be referred to as aggressor signals or "aggressors."

In some cases, the device may determine whether to compensate for crosstalk (e.g., apply a cancelation signal) based on the severity of the expected crosstalk. Since crosstalk arises from voltage changes from one modulation symbol to the next, the device may decide to apply compensation when the voltage changes of an aggressor signal are relatively large (e.g., when the voltage changes satisfy a certain threshold). By ignoring the crosstalk that arises from small voltage changes, the device can save power and processing resources and reduce overhead. In such cases, the device may also simplify the crosstalk contribution calculation for an aggressor by considering the voltage difference between adjacent symbol periods.

The device may determine that expected crosstalk is severe (e.g., higher than a certain threshold) by monitoring the most significant bits (MSBs) of symbols represented by an aggressor signal. For instance, the device may determine that the expected crosstalk is severe when it detects a change in the MSB of an aggressor signal. For example, the device may identify when the MBS changes from a 0 to a 1, or from a 1 to a 0, as this may correspond to a larger change in voltage than a change in less significant bits represented by symbols of the aggressor signal. For example, in PAM4, whereas a change in the least significant bit (LSB) correspond to a one-level voltage change of a signal, a change in the MSB correspond to a two-level voltage change of the signal, and thus the device may in some cases use a change in the MSB of symbols represented by the aggressor signal to detect large voltage changes in an aggressor signal (relative to changes associated with changes in less significant bits).

Features of the disclosure introduced above are further described with reference to FIGS. 1 through 3 in the context of memory devices, systems, and circuits that support pre-distortion for multi-level signals. Specific examples are then described with reference to FIGS. 4 and 5, which illustrate a multi-level signals that support pre-distortion. These and other features of the disclosure are further described with respect to FIGS. 6 through 10, which illustrate process flows, apparatus diagrams, and flowcharts that support source pre-distortion techniques for multi-level signaling.

FIG. 1 illustrates an example of a system 100 that uses one or more memory devices in accordance with aspects disclosed herein. The system 100 may include an external memory controller 105, a memory device 110, and a plurality of channels 115 that couple the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be a component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be coupled with or in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a GPU, a GPGPU, or a system on a chip (SoC), among other examples.

In some cases, the processor 120 may be incorporated into or part of the external memory controller 105. In some cases, the processor 120 may be a GPU that includes an I/O section with output drivers (e.g., on-chip drivers (OCDs)). Alternatively, the GPU may include or be connected to a DSP, which may replace, or be complementary to, the OCDs. The processor 120 may perform aspects of the pre-distortion techniques described herein. For example, the processor 120 may pre-distort (or facilitate the pre-distortion of) multi-level signals that are sent over channels 115. Pre-distorting the signals may include adding cancelation signals to the signals before transmitting them. In other cases, the processor 120 may receive pre-distorted multi-level signals (e.g., from memory device 110).

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. The peripheral component(s) 130 may be other components as would be understood by persons of ordinary skill in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that may provide information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, etc. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include output driver circuitry and various other circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are further described with reference to FIG. 2.

The memory arrays 170 may be examples of two-dimensional (2D) arrays of memory cells or may be examples of a three-dimensional (3D) arrays of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, multiple memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs, increase the performance of the memory array, or both. In some 3D memory devices, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may perform, or facilitate, aspects of the pre-distortion techniques described herein. For example, the device memory controller 155 may—itself or through the control of other components—pre-distort multi-level signals for transmission over channels 115. The device memory controller 155 may also receive multi-level signals that have been pre-distorted (e.g., by processor 120 or external memory controller 105).

The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal. The data clock signal may provide timing for multi-level signals sent over channels 115. For example, the data clock may provide timing information for determining the duration of symbol periods of a multi-level signal.

In some cases, the external memory controller 105 or other components of the system 100, or its functions described herein, may be implemented by the processor 120. For example, the external memory controller 105 may be hardware, firmware, or software, or some combination thereof implemented by the processor 120 or other component of the system 100. Although the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel. In some cases, a pin or pad of a terminal may be part of to a signal path of the channel 115.

Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170). A signal path may be implemented using one or more types of transmission lines, including differential transmission lines and single-ended transmission lines.

Channels 115 (and associated signal paths and terminals) may be dedicated to communicating specific types of information. In some cases, a channel 115 may be an aggregated channel and thus may include multiple individual channels. For example, a data channel 190 may be x4 (e.g., including four signal paths), x8 (e.g., including eight signal paths), x16 (including sixteen signal paths), etc.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include eight or nine signal paths.

In some cases, the channels 115 may include one or more clock signal (CK) channels 188. The CK channels 188 may be configured to communicate one or more common clock signals between the external memory controller 105 and the memory device 110. Each clock signal may be configured to adjust (e.g., oscillate) between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. In some cases, the clock signal may be a 1.5 GHz signal. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. For example, the channels 115 may include data channels 190-1 through 190-n. Each data channel may be associated with or include one or more transmission lines. The data channels 190 may be configured to communicate data and/or control information between the external memory controller 105 and the memory device 110. For example, the data channels 190 may communicate information (e.g., bi-directional) to be written to the memory device 110 or information read from the memory device 110. The data channels 190 may communicate signals that may be modulated using a variety of different modulation schemes (e.g., NRZ, PAM4).

In some cases, the channels 115 may include one or more other channels 192 that may be dedicated to other purposes. These other channels 192 may include any quantity of signal paths. In some cases, the other channels 192 may include one or more write clock signal (WCK) channels. Although the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK.

The WCK channels may be configured to communicate a common data clock signal between the external memory controller 105 and the memory device 110. The data clock signal may be configured coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels. The EDC channels may be configured to communicate error detection signals, such as checksums, to improve system reliability. An EDC channel may include any quantity of signal paths.

Signals communicated over the channels 115 (and their associated transmission lines) may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), PAM4, and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a PAM4 symbol may represent a logic 00, a logic 01, a logic 10, or a logic 11). Examples of multi-symbol modulation schemes include, but are not limited to, PAM4, PAM8, quadrature amplitude modulation (QAM), quadrature phase shift keying (QPSK), and others. A multi-symbol signal (e.g., a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

In some cases, a transmitting device that communicates via channels 115 using a multi-level modulation scheme (e.g., external memory controller 105 or memory device 110) may pre-distort a multi-level signal to cancel out anticipated crosstalk introduced by other signals. For example, the transmitting device may identify one or more other multi-level signals (aggressors), estimate a crosstalk contribution of the other multi-level signals, and generate and transmit a modified version of the multi-level signal (victim) based on the estimated crosstalk contribution of the other multi-level signals.

Figure 2:
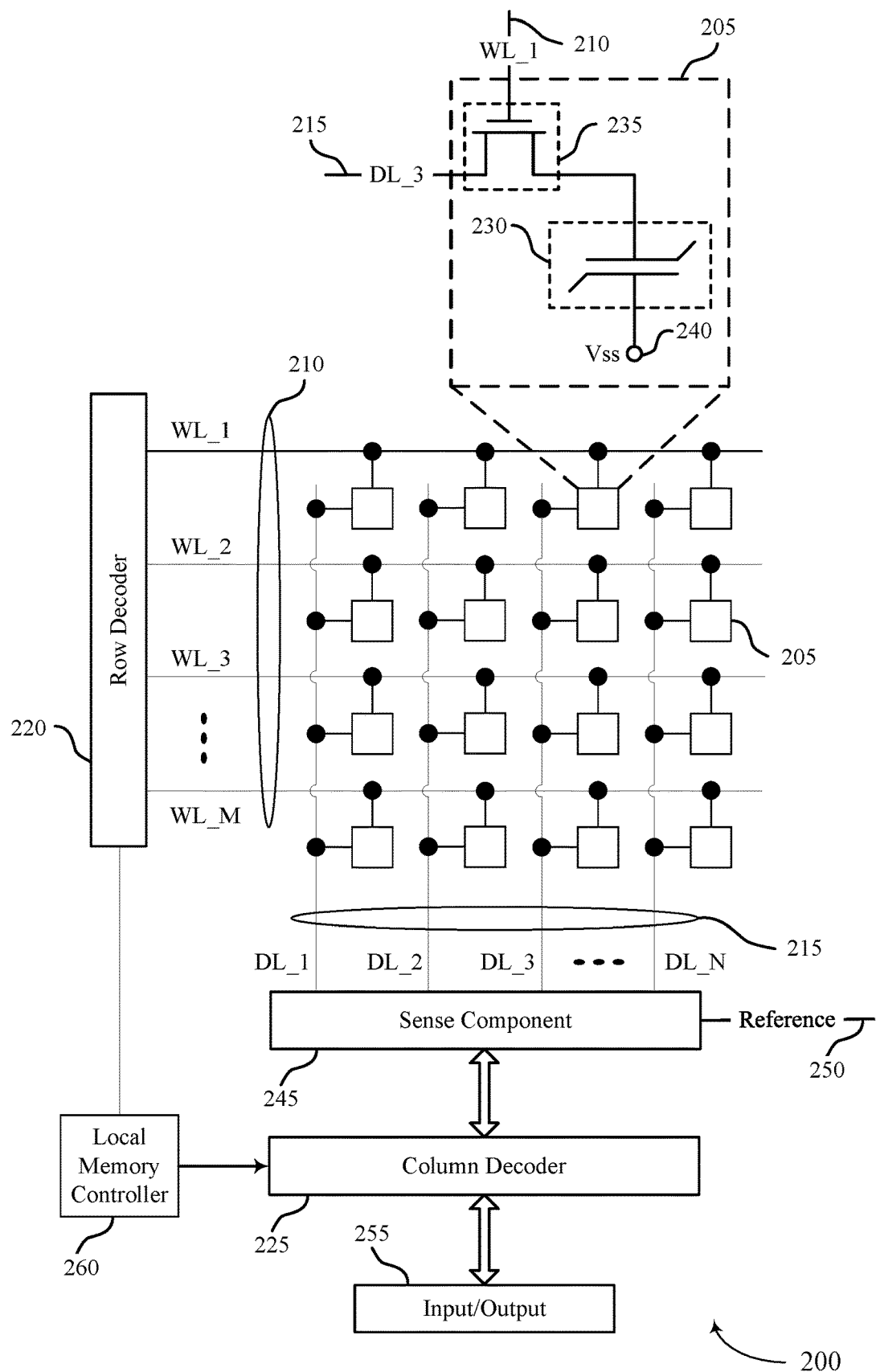
FIG. 2 illustrates an example of a circuit that supports pre-distortion for multi-level signaling in accordance with examples of the present disclosure.

FIG. 2 illustrates an example of a memory die 200 in accordance with various examples of the present disclosure. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. In DRAM architectures, a memory cell 205 may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 is a ground such as Vss. In some cases, the voltage source 240 may be an example of a plate line coupled with a plate line driver. The switching component 235 may be an example of a transistor or any other type of switch device that selectively establishes or de-establishes (e.g., ceases) electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 may be or include a transistor and its operation may be controlled by applying a voltage to the transistor gate, where the voltage differential between the transistor gate and transistor source may be greater or less than a threshold voltage of the transistor. In some cases, the switching component 235 may be or include a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that may be used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge.

During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0.

The sense component 245 may include various transistors or amplifiers to detect and amplify a difference in the signals. In some cases, the sense component 245 may be part of another component (e.g., a column decoder 225, row decoder 220). In some cases, the sense component 245 may be in electronic communication with the row decoder 220 or the column decoder 225

The detected logic states of memory cells 205, as determined by the sense component 245, may be output through column decoder 225 as output 255. Output 255 may pass the detected logic states to one or more intermediary components (e.g., a local memory controller) for transfer over one or more channels (e.g., for transmission over one or more transmission lines). Thus, the detected logic state of memory cells 205 may be conveyed to devices or components external to memory die 200.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations.

The local memory controller 260 may send data to, and receive data from, external devices via transmissions lines. As described herein, the local memory controller 260 may receive data from an external device that is in the form of (e.g., represented by) pre-distorted multi-level signals. Conversely, the local memory controller 260 may send to an external device data to that is in the form of pre-distorted multi-level signals. In an example of pre-distortion, the local memory controller 260 may estimate the crosstalk expected to arise during propagation of a victim signal. After estimating the crosstalk, the local memory controller 260 may generate a cancelation signal that is based on the estimated crosstalk and add it to the victim signal. Because the cancelation signal modifies the victim signal in a manner that compensates for the impact of the crosstalk, the victim signal may be more reliably received at a receiving device (e.g., with reduced error rates).

The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. The write operation may be for data received from an external device. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a first signal (e.g., voltage) to the digit line 215 during the write operation to store a first state (e.g., charge) in the capacitor 230 of the memory cell 205, and the first state (e.g., charge) may be indicative of a desired logic state.

In some cases, the local memory controller 260 may be configured to perform a read operation (e.g., a sense operation) on one or more memory cells 205 of the memory die 200. The read operation may be for data requested by, or intended for, an external device. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines.

The sense component 245 may amplify the signal. The local memory controller 260 may activate the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

The memory die 200 illustrates a two-dimensional (2D) array of memory cells. In some cases, the memory device may include three-dimensional (3D) arrays or memory cells. A 3D memory array may include two or more 2D memory arrays stacked on top of one another. In some cases, 2D memory arrays in a 3D memory array may be referred to as decks, levels, layers, or dies. A 3D memory array may include any quantity of stacked 2D memory arrays (e.g., two high, three high, four high, five high, six high, seven high, eight high). This may increase the quantity of memory cells that may be positioned on a single die or substrate as compared with a single 2D memory array, which in turn may reduce production costs, increase the performance of the memory array, or both. In some 3D memory arrays, different decks may share at least one common access line such that some decks may share at least one of a word line 210 or a digit line 215.

Figure 3:
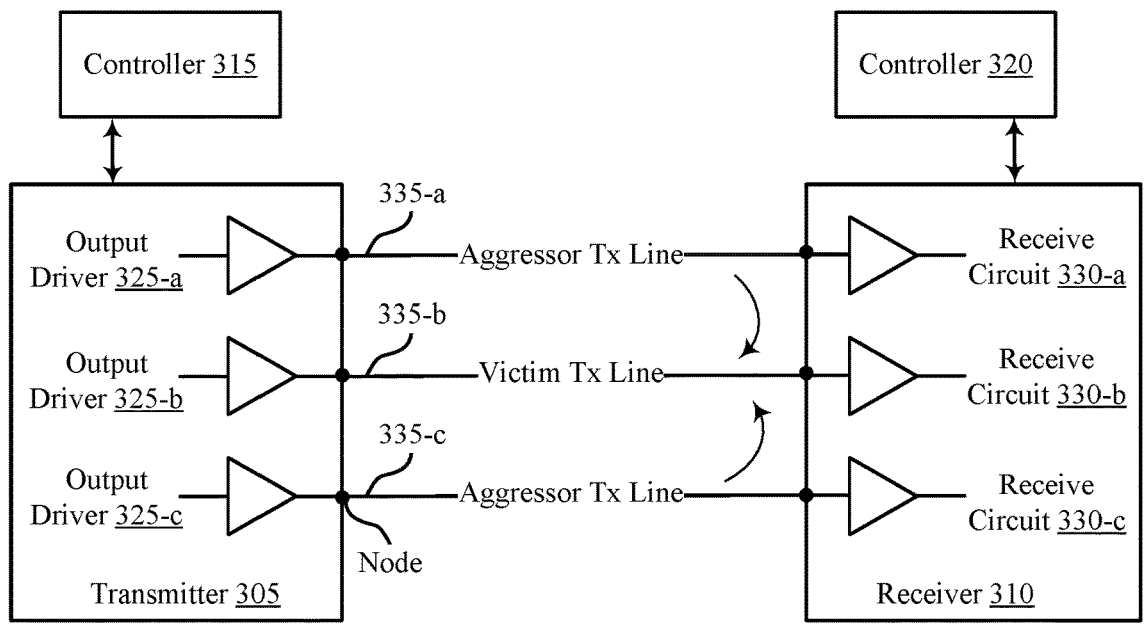
FIG. 3 illustrates an example of a system that supports pre-distortion for multi-level signaling in accordance with examples of the present disclosure.

FIG. 3 illustrates an example of a system 300 in accordance with various examples of the present disclosure. System 300 may be an example of a system 100 described with reference to FIG. 1. System 300 may include a transmitter 305 and a receiver 310. The transmitter 305 may be in electronic communication with or coupled with a controller 315, which may direct or control aspects of the transmitter's operation. The controller 315 may be an example of an external memory controller 105 (also referred to as a host or host device), a processor 120 (e.g., a GPU, a GPGPU, a CPU), a local memory controller 165, or a memory device 110 as described with reference to FIG. 1. The receiver 310 may be in electronic communication with or coupled with a controller 320, which may direct or control aspects of the receiver's operation.

The controller 320 may be an example of an external memory controller 105 (also referred to as a host or host device), a processor 120, a local memory controller 165 (e.g., for DRAM), or a memory device 110 as described with reference to FIG. 1. In some cases, the transmitter 305 may be a memory controller (e.g., an external memory controller 105, which can be a GPU or host device) and the receiver 310 is a memory device (e.g., a memory device 110). Or the receiver 310 may be a memory controller (e.g., an external memory controller 105, which can be a GPU or host device) and the transmitter 305 may be a memory device (e.g., a memory device 110).

The transmitter 305 may include output drivers 325, which may drive (e.g., output) multi-level data signals on transmission lines 335 (e.g., on first transmission line 335-*b*, second transmission line 335-*a*, and a third transmission line 335-*c*). The output drivers 325 may feature variable drive strengths (e.g., impedances), and may include circuitry to facilitate or implement the pre-distortion techniques described herein. For example, the output drivers 325 may be configured to modify their drive strengths based on instructions from the controller 315. In some cases, the output drivers 325 may be configured to modify their drive strengths by modifying their impedances (e.g., their output and/or load impedances) based on instructions from the controller 315.

In some cases, the output drivers 325 may be configured to implement pre-distortion by generating a cancelation signal and combining it with a multi-level data signal (e.g., a victim signal). Thus, an output driver 325 may drive a transmission line 335 based on the combination of the cancelation signal and multi-level signal. In another example, the cancelation signal may be combined (e.g., mixed) with the multi-level data signal by capacitively coupling it with a data signal. Thus, according to the techniques described herein, the output drivers 325 may transmit pre-distorted multi-level signals over the transmission lines 335.

In other cases, the pre-distortion is performed by a DSP. For example, the DSP may estimate the expected crosstalk and determine the voltage values to be used for symbols of a multi-level signal so that the crosstalk is compensated. The DSP may generate the multi-level signal itself, (e.g., modifying the drive strength of the multi-level signal according to the determine values), or pass the determine values to another component that generates the multi-level signal.

The transmitter 305 may pre-distort signals to compensate for crosstalk that arises from transmitting multiple signals simultaneously on transmission lines 335, which may be closely spaced. For example, when transmitter 305 drives signals concurrently on transmission line 335-*a*, transmission line 335-*b*, and transmission line 335-*c*, the signal on transmission line 335-*a* and the signal on transmission line 335-*c* may interfere with the signal on transmission line 335-*b*. Such interference may be referred to herein as crosstalk or cross coupling.

When considered from the perspective of transmission line 335-*b*, transmission line 335-*a* and transmission line 335-*c* are said to be aggressor transmission lines (and their signals are referred to as aggressor signals) and transmission line 335-*b* is said to be a victim line (and its signal is referred to as a victim signal). Although the signal on transmission line 335-*b* also interferes with the signals on transmission lines 335-*a* and 335-*c*, for ease of illustration crosstalk will only be discussed from the perspective of a single transmission line 335. However, the techniques described herein can be implemented for each transmission line 335 that experiences crosstalk. The techniques described herein may also be used to compensate for any quantity (e.g., any number, one to N) of aggressor signals or aggressor transmission lines.

The transmission lines 335 may each be included in a channel 115, such as a data channel 190 as described with reference to FIG. 1. Transmission lines 335 that are within a threshold distance of a victim transmission line 335 may be considered aggressor transmission lines 335. The threshold distance may be the distance between immediately adjacent transmission lines (e.g., transmission lines with no intervening transmission lines disposed between them) or some other distance. In some cases, the threshold distance may be determined based on a quantity of transmission lines (e.g., determined as to include at least two or some other number of nearest transmission lines on either side of the victim transmission line).

In another example, two transmission lines may be considered aggressor transmission lines 335 if signaling on one transmission line creates crosstalk that exceeds a threshold level (e.g., a threshold amount of energy) on the other transmission line. Although described with reference to two immediately adjacent aggressor transmission lines, the techniques described herein are applicable to any quantity of aggressor transmission lines in any orientation or configuration.

As shown in system 300, transmission lines 335 may originate at one component (e.g., transmitter 305) and terminate at another component (e.g., receiver 310) which may or may not be within the same device. The origination and termination points may be referred to as nodes (pins, pads, terminals, transmission line interfaces, interface components, or connection points) and may provide an interface between the transmission lines 335 and the transmitting and receiving devices. For example, the nodes may be made of a conductive material that is capable of transferring charge to and from the transmissions lines 335 and transmitter 305 (or receiver 310). Thus, the nodes may connect (e.g., physically and electrically) the transmission lines 335 to the greater electrical networks of the transmitter 305 and receiver 310.

The transmission lines 335 may be differential transmission lines or single-ended transmission lines. Thus, transmission lines 335 may be used to implement differential signaling or single-ended signaling. In differential signaling, two differential transmission lines are used to convey a single electrical signal from a transmitter to a receiver. One transmission line carries the signal and the other transmission line carries an inverted version of the signal. A receiver extracts information from the signals by detecting the potential difference between the inverted and non-inverted signals. In single-ended signaling, a single-ended transmission line is used to convey a single electrical signal from a transmitter to a receiver. In this case, a receiver extracts information from the signal by detecting the potential difference between the signal and a reference signal (e.g., a ground reference provided by another transmission line or supply).

As described above, crosstalk may arise when multiple signals are transmitted on different transmission lines at the same time. Such crosstalk may impact the integrity of effected signals by increasing or decreasing the voltage of those signals. If the crosstalk changes the voltage beyond a threshold amount (e.g., so as to be outside a data eye or symbol margin for an intended symbol), the data conveyed by the signal may be corrupted or lost. To combat this, a transmitter may compensate for expected crosstalk by generating a cancelation signal and adding the cancelation signal to a data signal before transmission. The cancelation signal may modify the data signal so that the crosstalk experienced by the data signal is reduced or canceled (e.g., so that the crosstalk experienced by the data signal brings the voltage of the signal closer to the desired value).

Compensation may be particularly advantageous for single-ended signaling as differential signals may be intrinsically resistant to crosstalk (to a certain extent). For example, as interference or noise from external sources (e.g., crosstalk from other transmission lines) is added equally to the inverted and non-inverted signals used in differential signaling—and since the receiver reacts to the voltage difference between the two signals—the impact of crosstalk may be mitigated. Single-ended transmissions do not feature such intrinsic crosstalk resistance because the receiver reacts to the difference between the received signal and a reference signal, where crosstalk may impact the received signal but not the reference signal.

Although shown as a distinct entity, in some cases the transmitter 305 may be collocated with a receiver. For example, the transmitter 305 may be part of a transceiver coupled with a GPU, GPGPU, CPU, or DRAM (or other memory device), or the like. In such cases, the transceiver may not only pre-distort signals before transmission, but also perform cancelation (e.g., post-distortion) on received signals (e.g., when the transceiver has more processing power than the transmitting device). For example, the transceiver may receive a multi-level signal that has been impacted by crosstalk during propagation over a transmission line. The transceiver may also receive an aggressor multi-level over a different transmission line.

Based on the received signals (e.g., based on transitions of the signals relative to each other in adjacent symbol periods, or based on changes in voltage of the aggressor signal between symbol periods), the transceiver may generate a cancelation signal and combine it with the received victim signal. After combining the received signal and the cancelation signal, the transceiver may process the resulting signal to determine its data. So, a device (e.g., a GPU, DSP, memory device, or memory controller) may perform pre-distortion on signals it transmits and may perform cancelation (e.g., post-distortion) on signals it receives.

Figure 4:
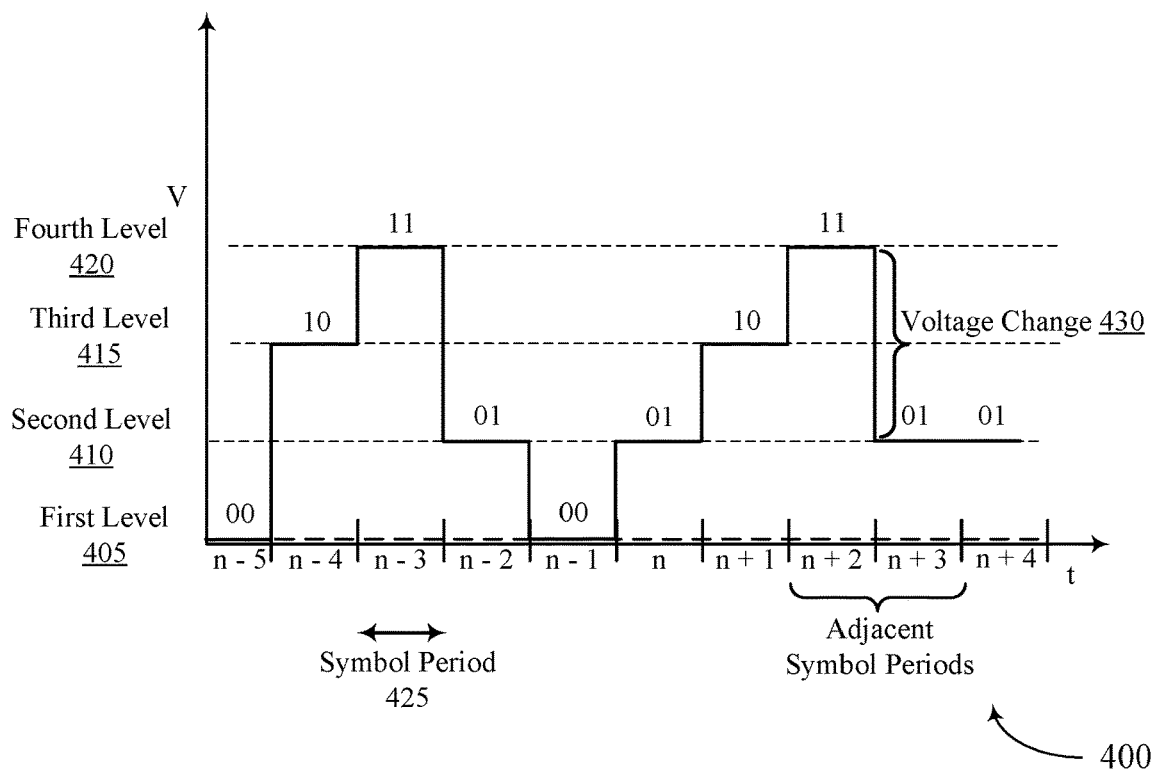
FIG. 4 illustrates an example of a multi-level signal that supports pre-distortion in accordance with various examples of the present disclosure.

FIG. 4 illustrates an example of a multi-level signal 400 that supports pre-distortion in accordance with various examples of the present disclosure. Multi-level signal 400 may be an example of a signal transmitted by transmitter 305, and received by receiver 310, as described with reference to FIG. 3. Multi-level signal 400 may be modulated according to a modulation scheme that includes three or more levels. For example, multi-level signal 400 may be modulated according to a PAM4 scheme that uses four voltage levels, each of which corresponds to a symbol that represents multiple bits. For example, a symbol in PAM4 may represent two bits: a most significant bit (MSB) and a least significant bit (LSB).

Multi-level signal 400 may include four voltage levels: first voltage level 405, second voltage level 410, third voltage level 415, and fourth voltage level 420. The first voltage level 405 may be the lowest voltage level (relative to the other levels used in the modulation scheme) and may correspond to a symbol that represents the value '00.' In some cases, the first voltage level may be 0V, or ground, or half of a supply voltage. The second voltage level 410 may be the second lowest voltage level and may correspond to a symbol that represents the value '01.' The third voltage level 415 may be the second highest voltage level and may correspond to a symbol represent the value '10.' The fourth voltage level 420 may be the highest voltage level and may correspond to a symbol that represents the value '11.' In some cases, the fourth voltage level may correspond to a supply voltage.

Each symbol of multi-level signal 400 may span the duration of a symbol period 425. As shown, the symbol period index may increment by one as time progresses. So, the symbol period n may occur later in time than (e.g., after) the symbol period n+1, and may occur earlier in time than (e.g., before) symbol period n−1. When two symbol periods are immediately next to one another in the time domain (e.g., there is no intervening symbol period between the two symbol periods), the symbol periods are said to be adjacent. Thus, symbol periods n+2 and n+3 are adjacent symbol periods. Put another way, symbol period n+2 may be said to be immediately before symbol period n+3.

Since the multi-level signal 400 includes ten symbols, and each symbol represents two bits of data, the multi-level signal 400 shown in FIG. 4 may represent a twenty-bit data sequence. Such a data sequence could be represented using a PAM2 modulation scheme that uses two voltage levels, each of which represents a single bit. But to obtain the same data rate, the PAM2 symbols would need to be sent at twice the rate of the PAM4 symbols. For example, to obtain a data rate of 20 Gb, PAM4 symbols could be sent with a period duration of 100 ps, but PAM2 symbols would need to be sent with a period duration of 50 ps. Thus, use of PAM4 signaling (or some other multi-level modulation scheme) rather than PAM2 signaling (or some other binary modulation scheme) may facilitate enhanced data rates, relatively relaxed timing requirements, or both.

However, a PAM4 implementation (or an implementation based on some other multi-level modulation scheme) may suffer more from crosstalk than a PAM2 implementation (or an implementation based on some other binary modulation scheme). For example, the difference between voltage levels may be reduced for PAM4 compared to PAM2. For instance, if the voltage swing between the highest and lowest level for both modulation schemes is the same, then the voltage difference between PAM4 symbols will be one-third the voltage difference between PAM2 symbols. This means that PAM4 signals may be more susceptible to errors caused by crosstalk, because even small changes in voltage resulting from crosstalk may cause a PAM4 symbol to change voltage levels (e.g., jump from the third voltage level 415 to the fourth voltage level 420). Thus, the pre-distortion techniques described herein may be particularly helpful for PAM4 or other forms of multi-level signaling.

In some cases, a device may identify a multi-level signal before transmitting it. For example, the device may identify multi-level signal 400. The identified multi-level signal may be an aggressor signal or a victim signal. The device may identify the multi-level signal so that it can determine the expected crosstalk inflicted by, or inflicted upon, the multi-level signal. The device may determine the expected crosstalk inflicted by a multi-level signal by evaluating the change in voltage between two adjacent symbol periods. For example, the device may determine the voltage change 430 in multi-level signal 400 between symbol period n+2 and n+3. Once the expected crosstalk for an aggressor signal is calculated, the device may use the expected crosstalk to generate a cancelation signal for pre-distortion of a victim signal.

In some cases, the device may decide whether to compensate for crosstalk based on the severity (e.g., expected impact) of the expected crosstalk. For example, the device may opt to compensate for high levels of crosstalk but not low levels of crosstalk. By selectively applying compensation, the device may reduce processing overhead, and conserve processing resources as well as power, without compromising the integrity of the signal.

Because crosstalk increases with increased voltage changes (e.g., larger voltage changes cause more severe crosstalk compared to smaller voltage changes), a device may determine whether crosstalk warrants compensation by evaluating the expected voltage change for an aggressor signal. If the voltage change is large (e.g., satisfies a threshold), the device may apply compensation to the victim data signal (e.g., the device may generate a compensated data signal by combining the data signal with a cancelation signal). If the voltage change is small (e.g., falls below a threshold), the device may refrain from applying compensation (e.g., the device may transmit an uncompensated version of the data signal).

In some cases, the device may determine whether the aggressor voltage change is large enough to justify compensation by evaluating the MSB of the aggressor signal. Since a change in the MSB of a signal represents at least a two-level voltage change (e.g., a change from the first voltage level 405, which represents '00', to the third voltage level, which represents '10'), the device may determine that compensation is justified when the MSB of an aggressor signal toggles (e.g., changes from a 0 to a 1, or vice versa). Thus, the device may apply compensation for the entirety of a signal, or for a portion of the signal (e.g., for select symbol periods of the signal).

Figure 5:
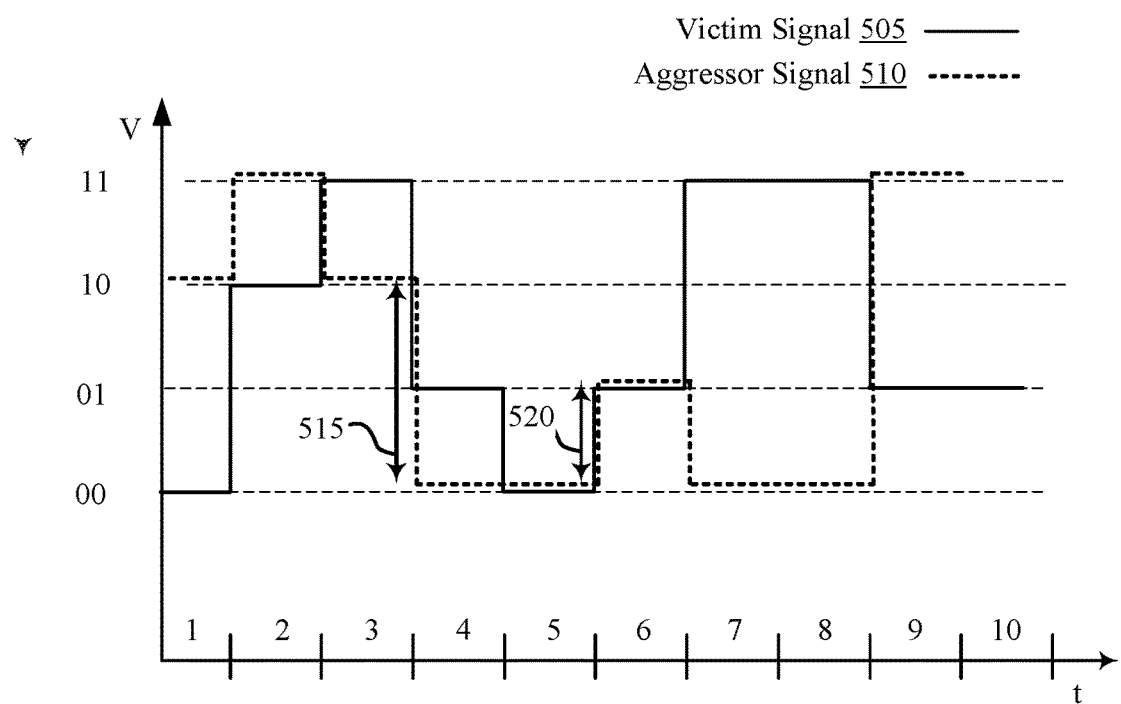
FIG. 5 illustrates an example of a multi-level signal that support pre-distortion in accordance with various examples of the present disclosure.

FIG. 5 illustrates an example of multi-level signals 500 that support pre-distortion in accordance with various examples of the present disclosure. Multi-level signals 500 may include a victim signal 505 (e.g., a first signal) and an aggressor signal 510 (e.g., a second signal). Multi-level signals 500 may represent the ideal signals intended for reception at a receiver. Although only two signals are shown, the techniques described herein can be applied to any quantity of signals.

A transmitting device may identify the multi-level signals 500 before transmitting them. For example, the device may identify victim signal 505, which is to be sent over a first transmission line. The device may also identify aggressor signal 510, which is to be sent over a second transmission line. Identifying the signals may allow the device to implement the pre-distortion techniques described herein. For example, the device may determine when to compensate for crosstalk based on the anticipated amplitudes of the identified signals. The device may also calculate crosstalk (and determine a cancelation signal) based on the amplitudes of the identified signals.

In some cases, a device may calculate the expected crosstalk for a victim signal by estimating the crosstalk contribution from each aggressor signal. For example, the device may calculate the expected crosstalk ($C_{exp}$) for victim signal 505 (v) using the following equation:

$$C_{exp} = \Sigma_{(a\ in\ A(v))} \Sigma_\tau [c_{va\tau}(T_a(n-\tau))] \quad (1)$$

where A(v) is the set of aggressor signals (e.g., A(v)={1, 2} for two aggressor signals), n is discrete time (e.g., 0, 100 ps, 200 ps, etc.), τ is the time lag between the aggressor signal and victim signal, $c_{va\tau}$ is the coupling coefficient of the aggressor line a to the victim line v with time lag τ, and $T_a(n-\tau)$ is the signal of the aggressor line at time n−τ at the transmitter. Each term of the second summation may represent the crosstalk contribution of a particular aggressor for a particular period of time, and the total crosstalk contribution from the aggressor may be the sum of all contribution across time.

The total expected crosstalk $C_{exp}$ may be the summation of the crosstalk contributions from each aggressor. As shown in equation (1), the crosstalk contribution for an aggressor may be a function of the coupling coefficient $c_{va\tau}$, which may be different for differential signaling and single-ended signaling. The coupling coefficient may be determined from a lookup table, which may be pre-populated (e.g., with the simulation or lab testing results) or populated upon boot-up (e.g., with the results of training).

So with respect to FIG. 5, a device may (according to equation (1)) estimate the crosstalk contribution for aggressor signal 510 (which may be referred to as the second multi-level signal) for a first period of time (e.g., (n+n)−τ) by determining a first value (e.g., a voltage value) of the aggressor signal 510 for a first symbol period (e.g., symbol period 2) and calculating the product of that value with the proper coupling coefficient. The device may estimate the crosstalk contribution for aggressor signal 510 for a second period of time (e.g., n−τ) by determining a second value of the aggressor signal 510 for a second symbol period (e.g., symbol period 1) and calculating the product of the second value with the proper coupling coefficient. And so on and so forth. Thus, the total crosstalk contribution of the aggressor signal may be based on the sum of 1) the product of the second value and the coupling coefficient and 2) the product of the first value and the coupling coefficient.

The effect of crosstalk on a victim signal may be expressed as:

$$R_v(n) = T_v(n) + \tau_{(a\ in\ A(v))} \Sigma_\tau [c_{va\tau}(T_a(n-\tau))] \quad (2)$$

where $R_v(n)$ is the signal of the victim line v at time n at the receiver and $T_v(n)$ is the signal of the victim line v at time n at the transmitter. As equation (2) shows, the receiver receives the ideal data signal (as transmitted by the transmitter) plus the undesired crosstalk contributions from the laboring aggressor lines (as calculated in equation (1)).

So, to compensate for the crosstalk from the aggressor lines, a device may generate and apply a cancelation signal to the data signal before transmitting it. The cancelation signal ($C_{sig}$) may be the inverse of the expected crosstalk and may be represented by:

$$C_{sig} = \Sigma_{(a\ in\ A(v))} \Sigma_\tau [c_{va\tau}(T_a(n-\tau))] \quad (3)$$

After generating the cancelation signal $C_{sig}$, the device may generate a compensated signal ($T_{v'}(n)$) by applying the cancelation signal as shown in equation (4).

$$T_{v'}(n) = T_v(n) + C_{sig} \quad (4)$$

where $T_{v'}(n)$ is the compensated signal transmitted by the transmitter and $T_v(n)$ is the desired signal.

Thus, a device may estimate (e.g., using equation (1)) a crosstalk contribution of a second multi-level signal (e.g., aggressor signal 510) to a first multi-level signal (e.g., victim signal 505) for an upcoming transmission. After estimating the crosstalk contributions, the device may generate a cancelation signal. The device then may generate a modified version of the first multi-level signal by combining the first multi-level signal with a cancelation signal (e.g., as defined in in equation (3)). Once the modified version of the first multi-level signal is generated (e.g., once $T_{v'}(n)$ is generated), the device may transmit the modified version of the first multi-level signal over its corresponding transmission line.

In some cases, a device may dynamically determine when to compensate for crosstalk. For example, a device may determine whether to compensate certain symbol periods of a data signal based on the severity of the expected crosstalk for those symbol periods. The device may determine the severity of the expected crosstalk by evaluating the voltage changes of the aggressor signal during those, or previous, symbol periods. For instance, the device may determine the voltage change of aggressor signal 510 between symbol periods 6 through 3. If the device determines that the aggressor signal's voltage changes by a threshold amount (e.g., by two voltage-levels) between two symbols, the device may compensate for crosstalk that arises from the voltage change. If the device determines that the aggressor signal's voltage does not change by a threshold amount, the device may opt not to compensate for the crosstalk that arises from the voltage change. Thus, the device may compensate for crosstalk that arises from the voltage change 515 (because it represents a two-level voltage change) but not compensate for crosstalk that arises from voltage change 520 (because it represents a one-level voltage change).

In some examples, the device may determine whether to apply compensation by comparing the voltage swing of the victim signal 505 relative to the voltage swing of the aggressor signal 510 for two adjacent symbols. For example, the device may determine the voltage differential (e.g., the voltage difference) between the victim signal 505 and aggressor signal 510 for a first symbol period. And the device may determine the voltage differential between the victim signal 505 and the aggressor signal 510 for a second symbol period adjacent to the first symbol period.

If the change in the voltage differential from the first symbol period to the second symbol period satisfies a threshold (e.g., ±3 voltage levels), the device may determine to compensate for crosstalk that arises from the voltage change. If the change in the voltage differential from the first symbol period to the second symbol period fails to satisfy the threshold (e.g., is ±2 voltage levels), the device may determine not to compensate for crosstalk that arises from the voltage change.

Thus, when this scheme is used, the device may compensate for crosstalk associated with the change in voltage differential that occurs between symbol periods 7 and 6 but not compensate for the crosstalk associated with the change in voltage differential that occurs between symbol periods 4 and 3. This is because the change in voltage differential for symbol periods 7 and 6 is +3 voltage levels (the victim signal 505 goes from being three voltage levels higher than the aggressor signal 510 in symbol 7 to having the same voltage in symbol period 6) but the change in voltage differential for symbol periods 4 and 3 is zero (the victim signal 505 stays one voltage level above the aggressor signal 510).

In some examples, the device may determine whether compensation is warranted (e.g., whether a change in voltage is large enough to produce a detrimental level of crosstalk) by monitoring the MSB of the aggressor signal 510. Because a change in MSB represents at least a two-level voltage (e.g., going from a '00' or '01' to a '10' or '11'), such a change may indicate when crosstalk is severe enough to compensate. So, a device may compare the MSBs represented by two symbols in two adjacent symbol periods and, if the MSBs are different, compensate for crosstalk resulting from the change in voltage associated with toggling the MSB.

However, if the MSBs are not different (e.g., the voltage has changed by at most one voltage level), the device may opt not to compensate for any associated crosstalk. Thus, when this scheme is used, the device may compensate for crosstalk arising from the MSB change between symbol periods 9 and 8 (when the MSB changes from a '1' (in '11') to a '0' (in '00'), but not compensate for crosstalk arising from the LSB change between symbol periods 2 and 1 (when the MSB remains 1). Thus, in some cases, the device may opt to apply compensation when it determines that the MSB scheduled for a first symbol period is different than the MSB scheduled for second (e.g., an adjacent) symbol period.

In some cases (e.g., when the aggressor MSB is determined to have changed between two symbol periods), a device may simplify its crosstalk calculation by only considering crosstalk contributions that arise from changes in the MSB. For example, the device may use the following equation to determine the expected crosstalk $C_{exp}$ for a victim signal at time n:

$$C_{exp}(n) = \tau_{(a \ in \ A(v))} [c_{va1}(T_a(n) - T_a(n-1)] \quad (5)$$

where $c_{va\tau}$ is the coupling coefficient of the aggressor line a to the victim line v with a time lag of unity (e.g., one), $T_a(n)$ is the signal of the aggressor line a at time n at the transmitter, and $T_a(n-1)$ is the signal of the aggressor line a at time n-1 at the transmitter.

Thus, the estimated crosstalk contribution of a first aggressor (e.g., a=1) at time n may be the product of 1) the coupling coefficient for that aggressor and 2) the difference between the aggressor signal for two adjacent symbol periods (e.g., $c_{v11}(T_1(n)-T_1(n-1))$. And the crosstalk contribution of a second aggressor (e.g., a=2) at time n may be the product of 1) the coupling coefficient for that aggressor and 2) the difference between the aggressor signal for two adjacent symbol periods (e.g., $c_{v21}(T_2(n)-T_2(n-1)$. And so on and so forth. Thus, the total expected crosstalk at time n ($C_{exp}(n)$) may be the summation of the crosstalk contributions from each aggressor.

Once the expected crosstalk is estimated, the device may determine a compensated signal ($T_v'(n)$) for time n as shown in equation (6):

$$T_v'(n) = T_v(n) - \Sigma_{(a \ in \ A(v))}[c_{va1}(T_a(n)-T_a(n-1)] \quad (6)$$

where $T_v(n)$ is the desired signal (e.g., the identified victim signal).

Figure 6:
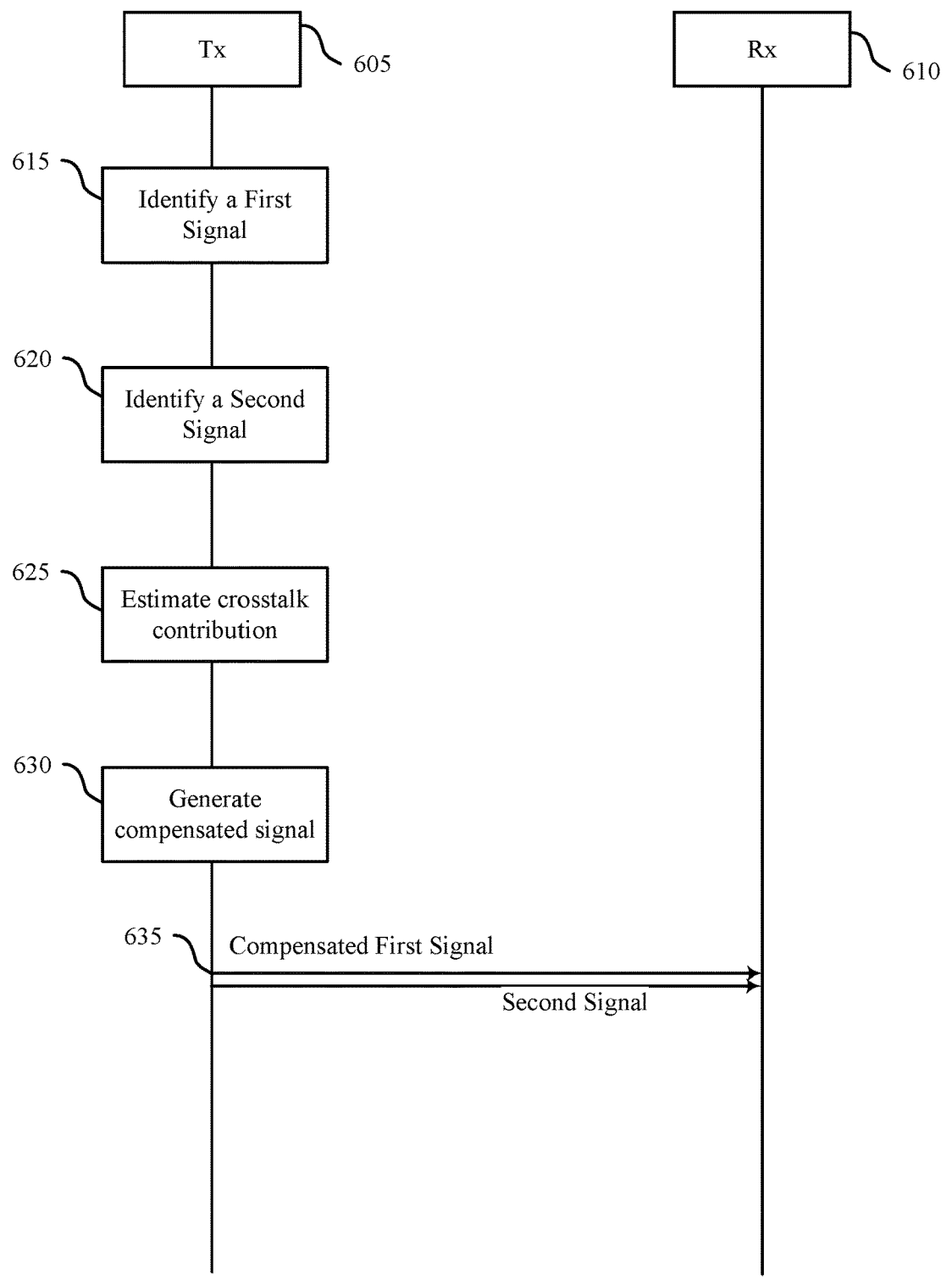
FIG. 6 illustrates an example of a process flow that supports pre-distortion for multi-level signaling in accordance with various examples of the present disclosure.

FIG. 6 illustrates an example of a process flow 600 that supports pre-distortion for multi-level signaling in accordance with various examples of the present disclosure. Aspects of process flow 600 may be performed or facilitated by a transmitter 605 and receiver 610. The transmitter 605 may be an example of a transmitter 305 described with reference to FIG. 3. And the receiver 610 may be an example of a receiver 310 described with reference to FIG. 3.

At 615, the transmitter 605 may identify a first signal to be sent over a first transmission line in a first upcoming transmission. In some examples, the transmitter 605 may identify a first sequence of bits to be communicated as the first multi-level signal to receiver 610. At 620, the transmitter 605 may identify a second signal to be sent over a second transmission line in a second upcoming transmission. For example, the transmitter 605 may identify a second sequence of bits to be communicated as the second multi-level signal to receiver 610. Thus, the first and second signals may be multi-level signals that are modulated according to a modulation scheme (e.g., PAM4) that includes a least three different levels. And identifying a signal may include determining a sequence of bits to be sent to a receiver and/or determining the voltage levels (or symbols) and symbol periods corresponding to those bits as defined by the selected modulation scheme. In some cases, the transmitter 605 may determine that the signals for the upcoming transmissions are to occur over transmission lines that are in close proximity (e.g., are within a threshold distance of one another). The transmitter 605 may additionally or alternatively determine that the upcoming transmissions overlap in time. Either or both of these determinations may serve as a basis for calculating the crosstalk contribution.

At 620, the transmitter 605 may estimate the crosstalk contribution of the second signal to the first signal for the upcoming transmission of the first signal. Estimating the crosstalk contribution may involve calculating one or more terms of equations (1) or (5). In some cases, estimating the crosstalk contribution includes determining a first value (e.g., a voltage value) of the second signal for a first symbol period and calculating the product of the first value and a coupling coefficient (e.g., calculating $C_{v11}(T_1(n-1))$ as shown in equation (1)). In some cases, estimating the crosstalk contribution includes determining a second value of the second signal for a second symbol period and calculating the product of the second value and the coupling coefficient (e.g., calculating $C_{v12}(T_1(n-2))$ as shown in equation (1). For example, the estimated crosstalk may be the sum of 1) the product of the second value and the coupling coefficient and 2) the product of the first value and the coupling coefficient (e.g., $C_{v12}(T_1(n-2))+C_{v11}(T_1(n-1))$).

In some cases, estimating the crosstalk includes determining a difference in voltage level of the second signal between two adjacent symbol periods (e.g., between a second symbol period and a first symbol period that is immediately before the second symbol period). For example, estimating the crosstalk may include calculating $C_{v11}(T_1(n))-T_1(n-1)$, as shown in equation (5).

At 625, the transmitter 605 may determine a cancelation signal that compensates for the calculated expected crosstalk. In some cases, the cancelation signal may be made up of multiple terms, each of which is the inverse of a calculated crosstalk contribution. Thus, the cancelation signal may be based on the estimated crosstalk contribution of the second signal.

At 630, the transmitter 605 may generate a compensated (e.g., modified) first signal for transmission. The compensated first signal may be generated by combining (e.g., adding) a multi-level signal that represents the identified first signal with another signal that represents the determined cancelation signal. In some cases, the modified signal is generated by modifying the drive strength of one or more output drivers associated with (e.g., used to drive) the first transmission line. In some cases, the modified signal is generated by modifying the impedance of the one or more output drivers. Or the modified signal may be generated by capacitively coupling the cancelation signal with the first signal.

At 635, the transmitter 605 may transmit, and the receiver 610 may receive, the second signal and the compensated first signal. The transmissions may overlap at least partially in time and may occur over different transmission lines. For example, the compensated first signal may be sent over the first transmission line and the second signal may be sent over the second transmission line. In some cases, the second signal may also be compensated.

Figure 7:
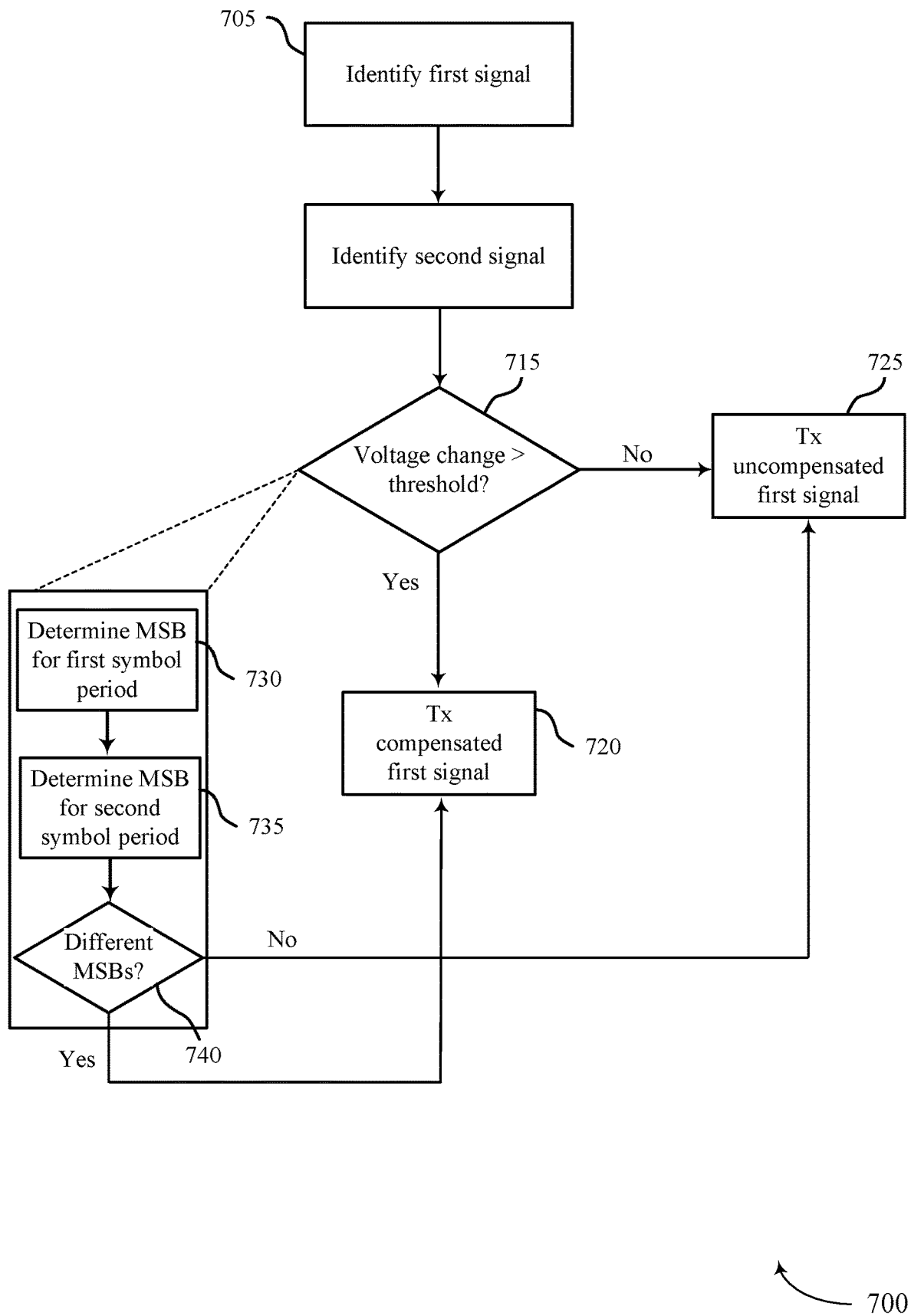
FIG. 7 illustrates an example of a process flow that supports pre-distortion for multi-level signaling in accordance with various examples of the present disclosure.

FIG. 7 illustrates an example of a process flow 700 that supports pre-distortion for multi-level signaling in accordance with various examples of the present disclosure. Aspects of process flow 700 may be performed or facilitated by device such as a transmitter, transceiver, or memory controller.

At 705, the device may identify a first signal to be sent over a first transmission line (e.g., a single-ended transmission line). At 710, the device may identify a second signal to be sent over a second transmission line. At 715, the device may determine whether the change in voltage of the second signal between two symbol periods (e.g., two adjacent symbol periods) satisfies a threshold. If the change in voltage satisfies the threshold, the device may determine to compensate the first signal. Thus, at 720, the device may transmit the compensated first signal.

Compensating the first signal may include determining the crosstalk contribution of the second signal, generating a cancelation signal based on the crosstalk contribution, and combining the cancelation signal with the first signal. If the change in voltage does not satisfy the threshold, the device may determine to transmit the signal without compensation. Thus, the device may transmit the uncompensated first signal at 725 without determining the expected crosstalk or cancelation signal.

In some cases, the device may determine whether the voltage change satisfies the threshold by comparing the voltages associated with symbols scheduled for adjacent symbol periods. For example, the device may determine whether the difference between the voltage associated with the first symbol and the voltage associated with the second symbol is greater than a predetermined value.

Alternatively, the device may determine whether the voltage change satisfies (e.g., is greater than) the threshold by determining whether the MSBs for two back-to-back symbols are different. For example, the device may, at 730, determine the value for a first MSB represented by a first symbol in a first symbol period. For example, the device may determine whether the MSB represents a '0' or a '1.' At 735, the device may determine the value for a second MSB represented by a second symbol in a second symbol periods that immediately follows the first symbol period.

For example, the device may determine whether the MSB represents a '0' or a '1.' At 740, the device may compare the two MSB values to determine whether the MSBs are different. If the MSBs are different, the device may decide to compensate the signal. If the MSBs are the same, the device may decide not to compensate the signal.

Figure 8:
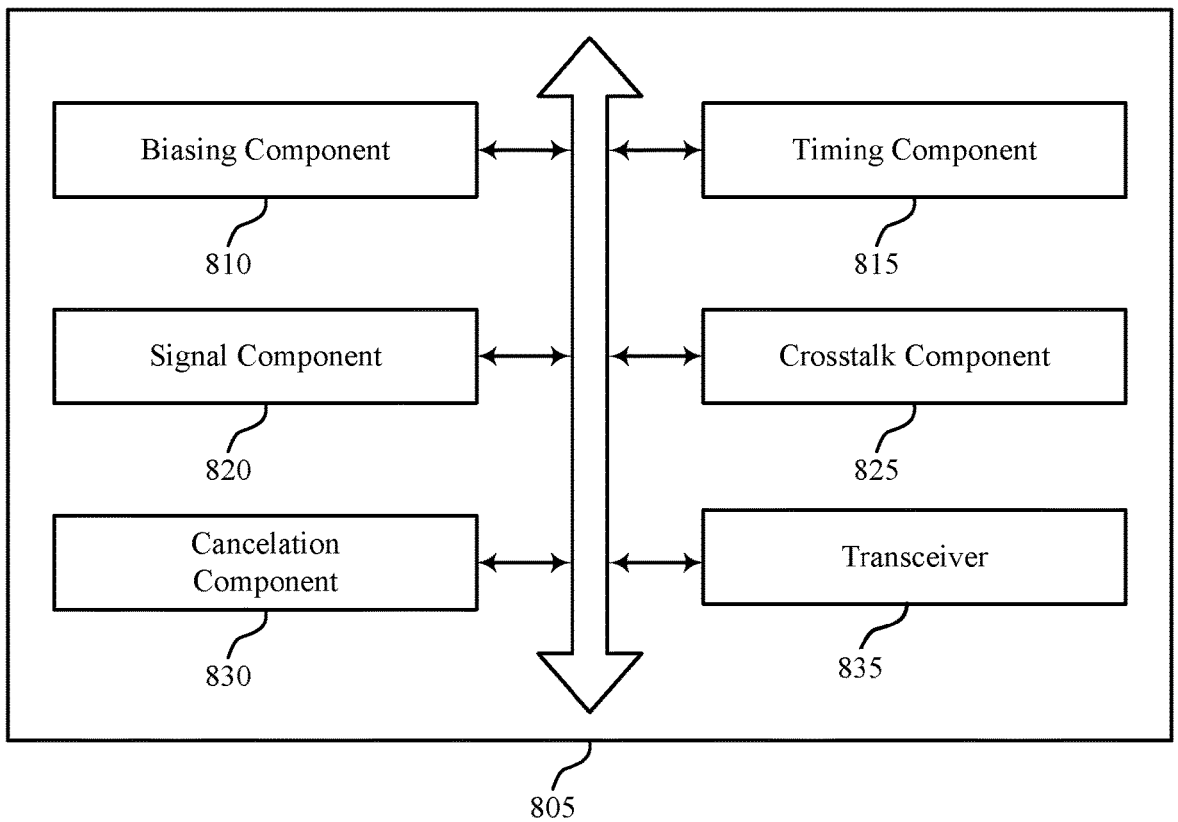
FIG. 8 shows a block diagram of a device that may support pre-distortion for multi-level signaling in accordance with various examples of the present disclosure.

FIG. 8 shows a block diagram 800 of a device 805 that may support pre-distortion for multi-level signaling in accordance with various examples of the present disclosure. The device 805 may be an example of an external memory controller 105 (also referred to as a host or host device) or local memory controller 165 or a memory device 110 described with reference to FIG. 1, a local memory controller 260 described with reference to FIG. 2, or a controller 315 or 320 described with reference to FIG. 3. The device 805 may include a biasing component 810 and a timing component 815. The device 805 may also include a signal component 820, a crosstalk component 825, a cancelation component 830, and a transceiver 835. Each of these modules may communicate, directly or indirectly, with one another (e.g., via one or more buses).

The biasing component 810 may provide or supply (e.g., via one or more voltage sources) the biasing voltages for implementing pre-distortion as described herein. For example, the biasing component 810 may generate the voltages used to bias the component or sub-circuits of one or more output drivers 325, such as output driver 325-b. In some cases, biasing component 810 may also provide the voltage used to activate or deactivate various components of a receive circuit 330.

The timing component 815 may control the timing of operations and voltage application (or removal) of various components of device 805. For example, the timing component 815 may dictate when the voltage applied to certain circuits, switching components, or nodes, is to be modified (e.g., applied or removed, increased or decreased).

In some cases, the device 805 may apply pre-distortion indiscriminately (e.g., regardless of the severity of the expected crosstalk). In these cases, the signal component 820 may identify a first multi-level signal at (or to be sent over) a first transmission line (e.g., transmission line 335-$b$). The first multi-level signal may be modulated according to a modulation scheme that includes three or more voltage levels (e.g., the modulation scheme may be a PAM4 scheme with four voltage levels that each correspond to a symbol representative or more than one bit). The signal component 820 may identify a second multi-level signal at (or to be sent over) a second transmission line. The second multi-level signal may be modulated according to the same modulation scheme as the first multi-level signal. In some cases, identifying a signal may include determining a sequence of bits for transmission. The first multi-level signal and the second multi-level signal may each be a single-ended signal.

The crosstalk component 825 may estimate a crosstalk contribution of the second multi-level signal to the first multi-level signal. In some cases, the crosstalk component 825 may determine a first value of the second multi-level signal for a first symbol period. The crosstalk component 825 may also calculate a product of the first value and a coupling coefficient (e.g., a coupling coefficient corresponding to the second transmission line and the first transmission line). Then the crosstalk component 825 may estimate the crosstalk contribution based at least in part on the product of the first value and the coupling coefficient.

In some cases, the crosstalk component 825 may determine a second value of the second multi-level signal for a second symbol period. The crosstalk component 825 may also calculate a product of the second value and the coupling coefficient. Then the crosstalk component 825 may estimate the crosstalk contribution based at least in part on a sum of the product of the second value and the coupling coefficient and the product of the first value and the coupling coefficient.

In some cases, the crosstalk component 825 may determine a difference in voltage level of the second multi-level signal between a second symbol period and a first symbol period that is immediately before the second symbol period. In such cases, the crosstalk component 825 may estimate the crosstalk contribution based at least in part on the determined difference in voltage level. In some examples, the crosstalk component 825 may determine the difference in voltage level by determining that a first MSB in (or scheduled for or to be transmitted in) the first symbol period is different than a second MSB in (or scheduled for or to be transmitted in) the second symbol period. In some cases, the crosstalk component 825 may determine that the estimated crosstalk satisfies a threshold and send an indication of the determination to other components of the device 805 (e.g., to the cancelation component 830).

The cancelation component 830 may generate a cancelation signal that is based on the estimated crosstalk contribution. In some cases, the cancelation signal may be generated when the estimated crosstalk satisfies a threshold level. The cancelation component 830 may generate one or more cancelation signals for an entire data signal or for a portion of a data signal. The cancelation component 830 may also generate a modified first multi-level signal that includes the first multi-level signal and the cancelation signal. The modified first multi-level signal may be a signal representative of the sequence of its identified by the signal component 820. In some cases, the cancelation component 830 may generate the modified signal based on the determination (e.g., as indicated by the crosstalk component 825) that difference in voltage level (e.g., the voltage level of two adjacent symbol periods for the second multi-level signal) satisfies the threshold.

In some cases, the cancelation component 830 generates the cancelation signal by modifying the drive strength of one or more output drivers. In some cases, the cancelation component 830 generates the cancelation signal by modifying the impedance of one or more output drivers. In some cases, the cancelation component 830 generates the modified first multi-level signal by capacitively coupling the cancelation signal with the first multi-level signal (e.g., with a signal representative of the sequence of bits identified by the signal component 820).

In some cases, the cancelation component 830 determines a change in voltage differential from a first symbol period to a second symbol period that is immediately subsequent to the first symbol period (e.g., between two adjacent symbol periods). The voltage differential may be between the first multi-level signal and the second multi-level signal. In such cases, the cancelation component 830 may determine that the change in voltage differential satisfies a threshold and generate the modified first multi-level signal based at least in part on determining that the change in voltage differential satisfies the threshold.

The transceiver 835 may transmit the modified first multi-level signal over the first transmission line. The transceiver 835 may also transmit the second multi-level signal over the second transmission line. In some cases, the second multi-level signal is a version of the second multi-level signal that has been modified according to the pre-distortion techniques described herein.

In some cases, the device 805 may apply compensation selectively (e.g., the device 805 may apply a cancelation signal when crosstalk is severe but not when crosstalk is negligible). In these instances (e.g., when compensation is applied on a dynamic basis), the signal component 820 may identify a first signal at (or to be communicated over) a first transmission line that is between a host device and a memory device. The signal component 820 may also identify second signal at (or to be communicated over) a second transmission line that is also between the host device and the memory device. The second transmission line may be adjacent to the first transmission line.

The crosstalk component 825 may determine that a voltage change of the second signal from a symbol period to a subsequent symbol period satisfies a threshold. In some cases, the crosstalk component 825 may determine that the voltage change satisfies the threshold by determining that a first MSB represented by a first symbol in (or scheduled for) the symbol period is different than a second MSB represented by a second symbol in (or scheduled for) the subsequent symbol period.

In some cases, the crosstalk component 825 may determine a voltage change of a third signal from the symbol period to the subsequent symbol period. The crosstalk component 825 may estimate a crosstalk contribution from the third signal to the first signal based at least in part on the voltage change of the third signal. In some cases, the crosstalk component 825 may send an indication of the crosstalk from the third signal to the cancelation component 830 so that the cancelation component may generate a cancelation signal that is based at least in part on a sum of the crosstalk contribution from the third signal and the crosstalk contribution from the second signal. The third signal may be at (or scheduled for transmission over) a third transmission line that is between the host device and the memory device. The third transmission line may also be adjacent to the first transmission line.

In some cases, the crosstalk component 825 may estimate a crosstalk contribution from the second signal to the first signal based at least in part on the voltage change of the second signal. In some cases, the crosstalk component 825 may pass an indication of the estimated crosstalk contribution to the cancelation component 830.

The cancelation component 830 may generate a cancelation signal based at least in part on the crosstalk contribution from the second signal. The cancelation component 830 may then generate a modified first signal based at least in part on the determination (that the voltage change of the second signal satisfies the threshold) and a cancelation signal.

The transceiver 835 may transmit, when the voltage change satisfies the threshold, the modified first signal via the first transmission line between the host device and the memory device. The transceiver 835 may also transmit the second signal over the second transmission line, and/or transmit the third signal over the third transmission line.

Figure 9:
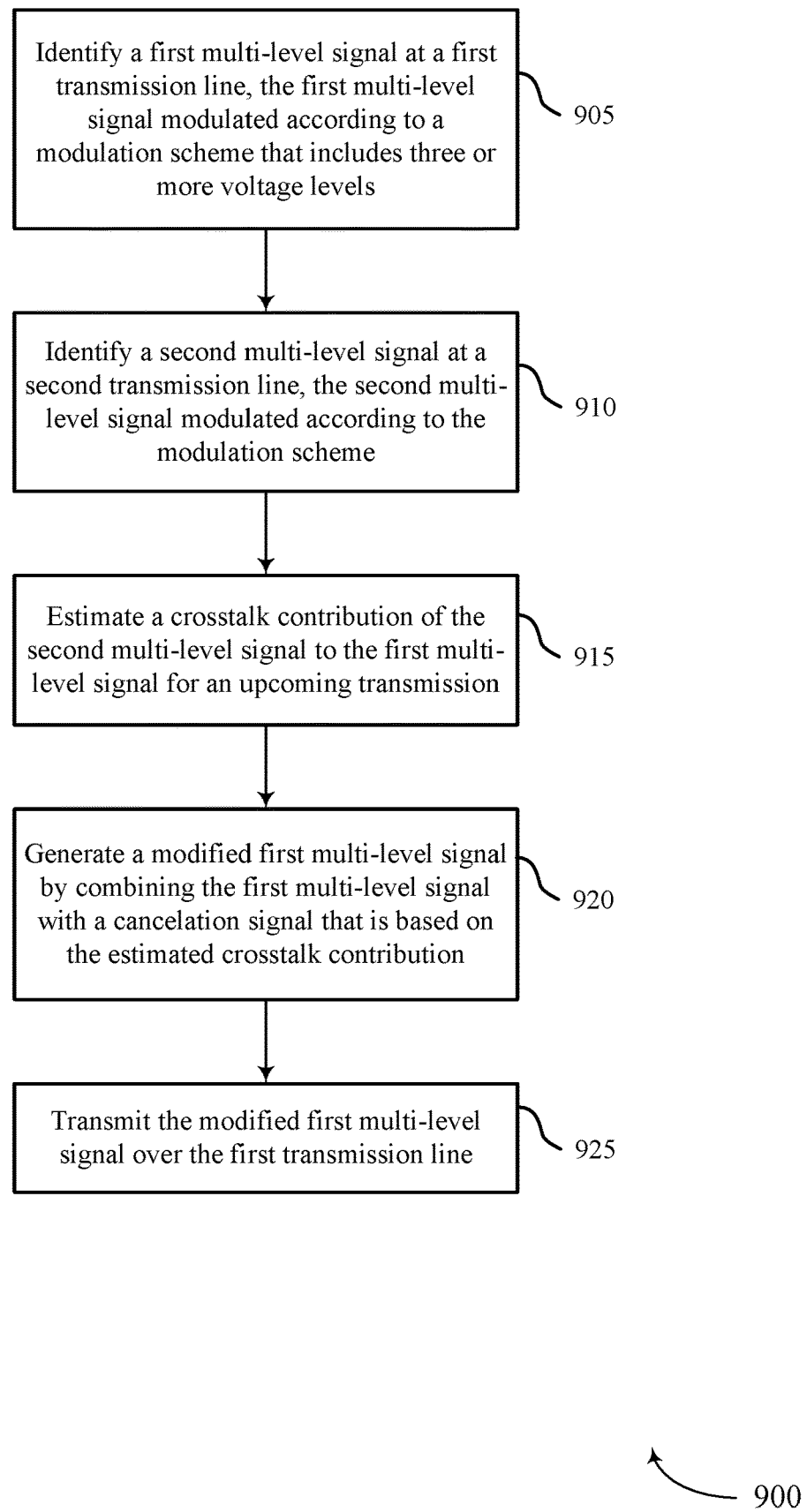
FIGS. 9 and 10 show flowcharts illustrating a method or methods that support pre-distortion for multi-level signaling in accordance with various examples of the present disclosure.

FIG. 9 shows a flowchart illustrating a method 900 that supports pre-distortion for multi-level signaling in accordance with various examples of the present disclosure. The operations of method 900 may be implemented by an apparatus or its components as described herein. For example, the operations of method 900 may be performed by a memory device as described with reference to FIGS. 1 through 7. In some examples, a memory controller may execute a set of instructions to control the functional elements of the memory device to perform the functions described below. Additionally or alternatively, a memory device may perform aspects of the functions described below using special-purpose hardware.

At 905, the apparatus may identify a first multi-level signal (e.g., a victim signal) at (or to be sent over) a first transmission line. The first multi-level signal may be modulated according to a modulation scheme that includes three or more voltage levels. In some cases, the modulation scheme is a PAM4 scheme that has four voltage levels that each correspond to a symbol representative or more than one bit. The operations of 905 may be performed according to the methods described with reference to FIGS. 3 through 7. In some examples, aspects of the operations of 905 may be performed by a signal component 820 as described with reference to FIG. 8.

At 910, the apparatus may identify a second multi-level signal (e.g., an aggressor signal) to be sent over a second transmission line. The second multi-level signal may be modulated according to the same modulation scheme as the first multi-level signal. In some cases, the first multi-level signal and the second multi-level signal are single-ended signals. The operations of 910 may be performed according to the methods described with reference to FIGS. 3 through 7. In some examples, aspects of the operations of 910 may be performed by a signal component 820 as described with reference to FIG. 8.

At 915, the apparatus may estimate a crosstalk contribution of the second multi-level signal to the first multi-level signal for an upcoming transmission. The operations of 915 may be performed according to the methods described with reference to FIGS. 3 through 7. In some examples, aspects of the operations of 915 may be performed by a crosstalk component 825 as described with reference to FIG. 8.

At 920, the apparatus may generate a modified first multi-level signal (e.g., a compensated victim signal) by combining the first multi-level signal with a cancelation signal that is based on the estimated crosstalk contribution. The operations of 920 may be performed according to the methods described with reference to FIGS. 3 through 7. In some examples, aspects of the operations of 920 may be performed by a cancelation component 830 as described with reference to FIG. 8.

At 925, the apparatus may transmit the modified first multi-level signal over the first transmission line. The operations of 925 may be performed according to the methods described with reference to FIGS. 3 through 7. In some examples, aspects of the operations of 925 may be performed by a transceiver 835 as described with reference to FIG. 8.

In some examples, an apparatus as described herein may perform a method or methods, such as the method 900. The apparatus may include features, means, or instructions (e.g., a non-transitory computer-readable medium storing instructions executable by a processor) for determining a difference in voltage level of the second multi-level signal between a second symbol period and a first symbol period that is immediately before the second symbol period (e.g., determining $(T_1(n)-T_1(n-1))$).

Put another way, the apparatus may determine a difference in voltage level of the second multi-level signal for a second symbol and a first symbol that is immediately before the second symbol. In such cases, the method may include estimating the crosstalk contribution based at least in part on the difference in voltage level. In some examples, the method further includes determining that the difference in voltage level satisfies a threshold and generating the modified first multi-level signal based at least in part on determining that the difference in voltage level satisfies a predetermined threshold. In some examples of the method, apparatuses, and non-transitory computer-readable medium described herein, determining the difference in voltage level may include operations, features, means, or instructions for determining that an MSB scheduled for the first symbol period may be different than a second MSB scheduled for the second symbol period. Thus, the apparatus may determine that that a first MSB of (or represented by) the first symbol is different than a second MSB of (or represented by) the second symbol.

The apparatus may also include features, means, or instructions (e.g., a non-transitory computer-readable medium storing instructions executable by a processor) for generating the modified first multi-level signal based at least in part on modifying a drive strength of an output driver. Additionally or alternatively, the apparatus may include features, means, or instructions (e.g., a non-transitory computer-readable medium storing instructions executable by a processor) for generating the modified first multi-level signal based at least in part on modifying an impedance of an output driver. Additionally or alternatively, the apparatus may include features, means, or instructions (e.g., a non-transitory computer-readable medium storing instructions executable by a processor) for generating the cancelation signal and generating the modified first multi-level signal based at least in part on capacitively coupling the cancelation signal with the first multi-level signal.

Some examples of the method, apparatuses, and non-transitory computer-readable medium described herein may further include operations, features, means, or instructions for determining a first value of the second multi-level signal for a first symbol period, calculating a product of the first value and a coupling coefficient, the coupling coefficient corresponding to the second transmission line and the first transmission line, and estimating the crosstalk contribution based on the product of the first value and the coupling coefficient.

Some examples of the method, apparatuses, and non-transitory computer-readable medium described herein may further include operations, features, means, or instructions for determining a second value of the second multi-level signal for a second symbol period, calculating a product of the second value and the coupling coefficient, and estimating the crosstalk contribution based on a sum of the product of the second value and the coupling coefficient and the product of the first value and the coupling coefficient.

Some examples of the method, apparatuses, and non-transitory computer-readable medium described herein may further include operations, features, means, or instructions for determining a change in voltage differential from a first symbol period to a second symbol period that may be immediately subsequent to the first symbol period. The voltage differential may be between the first multi-level signal and the second multi-level signal. Some examples of the method, apparatuses, and non-transitory computer-readable medium described herein may further include operations, features, means, or instructions for determining that the change in voltage differential satisfies a threshold and generating the modified first multi-level signal based on determining that the change in voltage differential satisfies the threshold.

Figure 10:
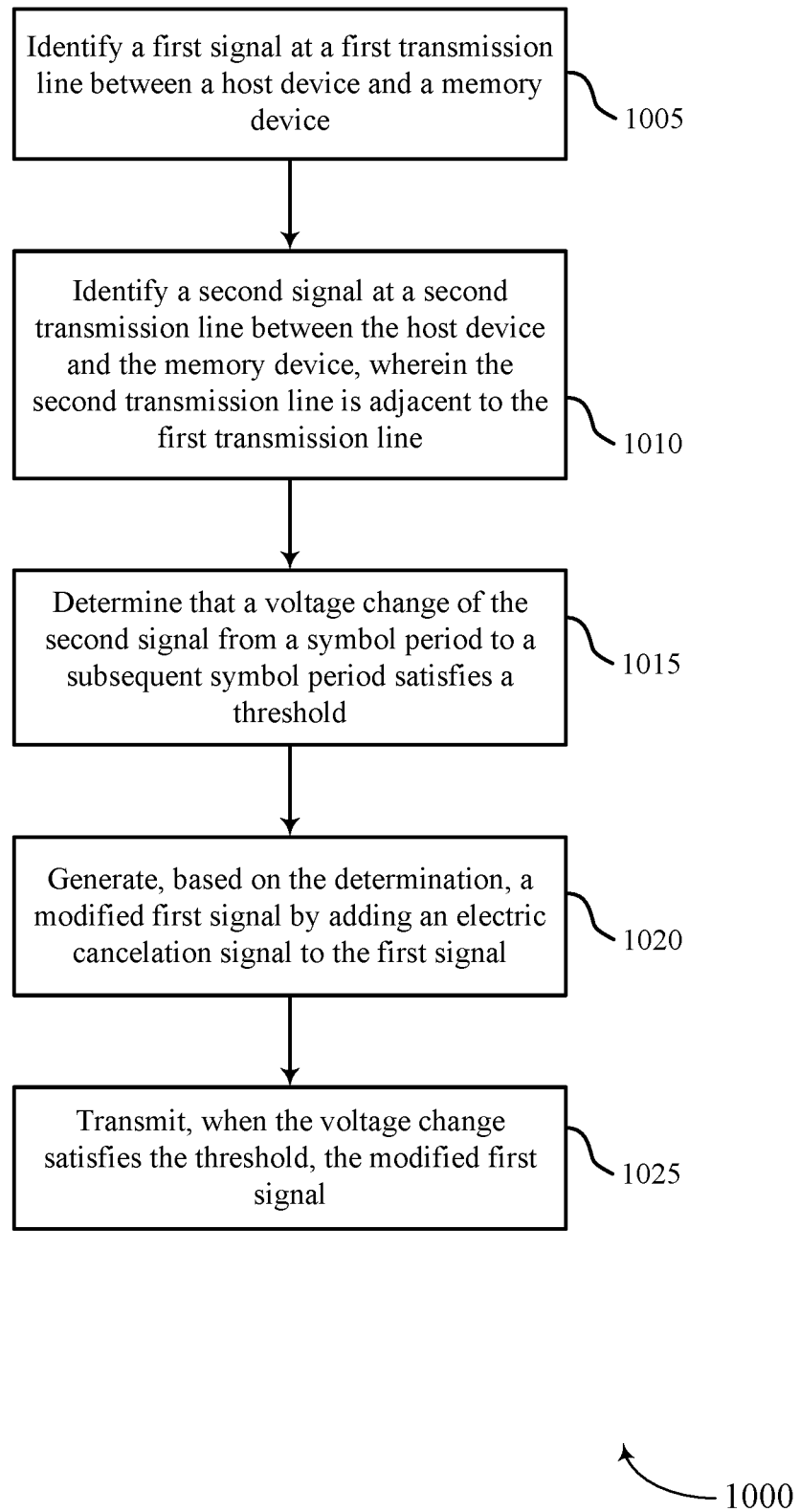

FIG. 10 shows a flowchart illustrating a method 1000 that supports pre-distortion for multi-level signaling in accordance with various examples of the present disclosure. The operations of method 1000 may be implemented by an apparatus or its components as described herein. For example, the operations of method 1000 may be performed by a memory device as described with reference to FIGS. 1 through 7. In some examples, a memory controller may execute a set of instructions to control the functional elements of the memory device to perform the functions described below. Additionally or alternatively, a memory device may perform aspects of the functions described below using special-purpose hardware.

At 1005, the apparatus may identify a first signal at (or to be sent over) a first transmission line. The first transmission line may be between host device and a memory device. The operations of 1005 may be performed according to the methods described with reference to FIGS. 3 through 7. In some examples, aspects of the operations of 1005 may be performed by a signal component 820 as described with reference to FIG. 8.

At 1010, the apparatus may identify a second signal at (or to be sent over) a second transmission line. Like the first transmission line, the second transmission line may be between the host device and the memory device. The second transmission line may be adjacent to the first transmission line. The operations of 1010 may be performed according to the methods described with reference to FIGS. 3 through 7. In some examples, aspects of the operations of 1010 may be performed by a signal component 820 as described with reference to FIG. 8.

At 1015, the apparatus may determine that a voltage change of the second signal from a symbol period to a subsequent symbol period satisfies a threshold. The operations of 1015 may be performed according to the methods described with reference to FIGS. 3 through 7. In some examples, aspects of the operations of 1015 may be performed by a crosstalk component 825 as described with reference to FIG. 8.

At 1020, the apparatus may generate, based on the determination, a modified first signal by adding an electric cancelation signal to the first signal. The operations of 1020 may be performed according to the methods described with reference to FIGS. 3 through 7. In some examples, aspects of the operations of 1020 may be performed by a cancelation component 830 as described with reference to FIG. 8.

At 1025, the apparatus may transmit, when the voltage change satisfies the threshold, the modified first signal. The operations of 1025 may be performed according to the methods described with reference to FIGS. 3 through 7. In some examples, aspects of the operations of 1025 may be performed by a transceiver 835 as described with reference to FIG. 8.

In some examples, an apparatus as described herein may perform a method or methods, such as the method 1000. The apparatus may include features, means, or instructions (e.g., a non-transitory computer-readable medium storing instructions executable by a processor) for estimating a crosstalk contribution from the second signal to the first signal based at least in part on the voltage change of the second signal and generating the electric cancelation signal based at least in part on the crosstalk contribution from the second signal.

Some examples of the method, apparatuses, and non-transitory computer-readable medium described herein may further include operations, features, means, or instructions for determining a voltage change of a third signal from the symbol period to the subsequent symbol period, the third signal to be sent over a third transmission line. Some examples of the method, apparatuses, and non-transitory computer-readable medium described herein may further include operations, features, means, or instructions for estimating a crosstalk contribution from the third signal to the first signal based at least in part on the voltage change of the third signal. Some examples of the method, apparatuses, and non-transitory computer-readable medium described herein may further include operations, features, means, or instructions for generating the electric cancelation signal based at least in part on a sum of the crosstalk contribution from the third signal and the crosstalk contribution from the second signal.

In some examples of the method, apparatuses, and non-transitory computer-readable medium described herein, determining that the voltage change satisfies the threshold may include operations, features, means, or instructions for determining that a first MSB represented by a first symbol scheduled for the symbol period may be different than a second MSB represented by a second symbol scheduled for the subsequent symbol period.

It should be noted that the methods described above describe possible implementations, and that the operations and the steps may be rearranged or otherwise modified and that other implementations are possible. Furthermore, aspects from two or more of the methods may be combined.

In some examples, an apparatus or device may perform aspects of the functions described herein using general- or special-purpose hardware. The apparatus or device may include a first node configured to communicate with a memory device via a first transmission line. The apparatus or device may also include a second node configured to communicate with the memory device via a second transmission. The second transmission line may be adjacent to the first transmission line. The first transmission line and the second transmission line may be single-ended transmission lines.

The apparatus or device may include a memory controller configured to identify a first multi-level signal at (or to be sent over) the first transmission line in accordance with a modulation scheme that includes three or more voltage levels. The memory controller may also be configured to identify a second multi-level signal at (or to be sent over) the second transmission line in accordance with the modulation scheme. The memory controller may also be configured to estimate a crosstalk contribution of the second multi-level signal to the first multi-level signal for an upcoming transmission. The memory controller may also be configured to generate a modified first multi-level signal by combining the first multi-level signal with a cancelation signal that is based at least in part on the estimated crosstalk contribution. The memory controller may also be configured to transmit the modified first multi-level signal over the first transmission line.

In some cases, the apparatus also includes an output driver coupled with the first transmission line. In such cases, the memory controller may be configured to generate the modified first multi-level signal based at least in part on modifying a drive strength of the output driver.

In some cases, the memory controller is configured to 1) determine a difference in voltage level of the second multi-level signal between a second symbol period and a first symbol period that is immediately before the second symbol period and 2) estimate the crosstalk contribution based at least in part on the difference in voltage level.

In some examples, the memory controller is configured to determine that the difference in voltage level satisfies a threshold and generate the modified first multi-level signal based at least in part on determining that the difference in voltage level satisfies a predetermined threshold. In some examples, the memory controller is configured to determine the difference in voltage by being configured to determine that a first most MSB scheduled for the first symbol period is different than a second MSB scheduled for the second symbol period.

In some cases, the memory controller is configured to 1) determine a first value of the second multi-level signal for a first symbol period, 2) calculate a product of the first value and a coupling coefficient (e.g., a coupling coefficient corresponding to the second transmission line and the first transmission line), and 3) estimate the crosstalk contribution based at least in part on the product of the first value and the coupling coefficient.

In some cases, the memory controller is configured to determine a second value of the second multi-level signal for a second symbol period and calculate a product of the second value and the coupling coefficient. In some cases, the memory controller is configured to estimate the crosstalk contribution based at least in part on a sum of the product of the second value and the coupling coefficient and the product of the first value and the coupling coefficient.

In some cases, the memory controller is configured to 1) determine a first voltage differential between the first and second multi-level signals, the first voltage differential for a first symbol period, 2) determine a second voltage differential between the first and second multi-level signals, the second voltage differential for a second symbol period, and 3) generate the modified first multi-level signal based at least in part on the difference satisfying the threshold.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

In some examples, an apparatus may perform aspects of the functions described herein. The apparatus may include a first node configured to communicate with a memory device via a first transmission line and a second node configured to communicate with the memory device via a second transmission line adjacent to the first transmission line. The apparatus may also include: means for identifying a first multi-level signal at the first transmission line in accordance with a modulation scheme that includes three or more voltage levels; means for identifying a second multi-level signal at the second transmission line in accordance with the modulation scheme; means for estimating a crosstalk contribution of the second multi-level signal to the first multi-level signal for an upcoming transmission; means for generating a modified first multi-level signal by combining the first multi-level signal with a cancelation signal that is based at least in part on the estimated crosstalk contribution; and means for transmitting the modified first multi-level signal over the first transmission line. In some examples, the first transmission line and the second transmission line comprise single-ended transmission lines.

In some examples, the apparatus may include means for determining a difference in voltage level of the second multi-level signal between a second symbol period and a first symbol period that is immediately before the second symbol period. The apparatus may also include means for estimating the crosstalk contribution based at least in part on the difference in voltage level.

In some examples, the apparatus may include means for determining that the difference in voltage level satisfies a threshold and means for generating the modified first multi-level signal based at least in part on determining that the difference in voltage level satisfies a predetermined threshold.

In some examples, the means for determining the difference in voltage level comprises means for determining that a first MSB scheduled for the first symbol period is different than a second MSB scheduled for the second symbol period.

In some examples, the apparatus may include: means for determining a first value of the second multi-level signal for a first symbol period; means for calculating a product of the first value and a coupling coefficient, the coupling coefficient corresponding to the second transmission line and the first transmission line; and means for estimating the crosstalk contribution based at least in part on the product of the first value and the coupling coefficient.

In some examples, the apparatus may include: means for determining a second value of the second multi-level signal for a second symbol period; means for calculating a product of the second value and the coupling coefficient; and means for estimating the crosstalk contribution based at least in part on a sum of the product of the second value and the coupling coefficient and the product of the first value and the coupling coefficient.

In some examples, the apparatus may include: means for determining a first voltage differential between the first and second multi-level signals, the first voltage differential for a first symbol period; means for determining a second voltage differential between the first and second multi-level signals, the second voltage differential for a second symbol period; means for determining that a difference between the first voltage differential and the second voltage differential satisfies a threshold; and means for generating the modified first multi-level signal based at least in part on the difference satisfying the threshold.

In some examples, the apparatus may include an output driver coupled with the first transmission line. In such examples, the apparatus may include means for generating the modified first multi-level signal based at least in part on modifying a drive strength of the output driver.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" and "coupled with" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some cases, may be employed as an electrical contact to a memory cell or other component of a memory array. An electrode may include a trace, wire, conductive line, conductive layer, or the like that provides a conductive path between elements or components of memory array.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily doped, e.g., degenerate, semiconductor region. The source and drain may be separated by a lightly doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
identifying a first set of symbols for a first multi-level signal and a second set of symbols for a second multi-level signal, the first and second sets of symbols associated with a pulse amplitude modulation scheme;
determining a voltage level difference for the second set of symbols for the second multi-level signal;
estimating a crosstalk contribution of the second multi-level signal to the first multi-level signal based at least in part on the voltage level difference; and
transmitting a compensated version of the first multi-level signal during symbol periods representing the first set of symbols based at least in part on the estimated crosstalk contribution.

2. The method of claim 1, wherein the second set of symbols comprises two adjacent symbols.

3. The method of claim 1, further comprising:
determining that the voltage level difference satisfies a threshold, wherein the compensated version of the first multi-level signal is transmitted based at least in part on the voltage level difference satisfying the threshold.

4. The method of claim 3, further comprising:
determining a product of the voltage level difference and a coupling factor of the second multi-level signal, wherein the crosstalk contribution is estimated based at least in part on the product of the voltage level difference and the coupling factor.

5. The method of claim 1, wherein the second set of symbols comprises a first symbol and a second symbol, and wherein determining the voltage level difference comprises:
determining that a most significant bit of the first symbol has a different value than a most significant bit of the second symbol.

6. The method of claim 1, wherein transmitting the compensated version of the first multi-level signal comprises:
modifying, for the first set of symbols, a drive strength of a driver configured to transmit the first multi-level signal, the drive strength modification relative to a nominal drive strength associated with the first set of symbols; or
modifying, for the first set of symbols, an impedance of a driver configured to transmit the first multi-level signal, the impedance modification relative to a nominal impedance associated with the first set of symbols.

7. The method of claim 1, wherein transmitting the compensated version of the first multi-level signal comprises:
combining, via capacitive coupling during the symbol periods representing the first set of symbols, the first multi-level signal with a cancelation signal that is generated based at least in part on the estimated crosstalk contribution.

8. The method of claim 1, wherein the first multi-level signal is transmitted over a first transmission line and the second multi-level signal is transmitted over a second transmission line.

9. The method of claim 8, wherein transmission of the first multi-level signal and transmission of the second multi-level signal overlap at least partially in time.

10. A method, comprising:
identifying a first set of symbols for a first multi-level signal for a first transmission line and a second set of symbols for a second multi-level signal for a second transmission line;
determining a difference in value between two adjacent symbols of the second set of symbols;
determining a severity of an expected crosstalk contribution of the second multi-level signal to the first multi-level signal for the second set of symbols, wherein the severity of the expected crosstalk contribution is determined based at least in part on the difference in value; and
transmitting a compensated version of the first multi-level signal during symbol periods representing the first set of symbols based at least in part on the severity of the expected crosstalk contribution satisfying a threshold severity.

11. The method of claim 10, further comprising:
estimating a severity of an expected crosstalk contribution of the second multi-level signal to the first multi-level signal for a third set of symbols for the second multi-level signal; and
transmitting an uncompensated version of the first multi-level signal during symbol periods representing a fourth set of symbols based at least in part on the severity of the expected crosstalk contribution failing to satisfy the threshold severity.

12. The method of claim 10, further comprising:
determining a value of a most significant bit of a first symbol of the second set of symbols, wherein the severity of the expected crosstalk contribution is based at least in part on the value.

13. The method of claim 12, further comprising:
determining a second value of a most significant bit of a second symbol of the second set of symbols, wherein the severity of the expected crosstalk contribution is based at least in part on the second value.

14. A method, comprising:
identifying a first set of symbols for a first multi-level signal for a first transmission line and a second set of symbols for a second multi-level signal for a second transmission line;
estimating an expected voltage change between two adjacent symbols of the second set of symbols;
determining a severity of an expected crosstalk contribution of the second multi-level signal to the first multi-level signal for the second set of symbols, wherein the severity of the expected crosstalk contribution is determined based at least in part on the expected voltage change; and
transmitting a compensated version of the first multi-level signal during symbol periods representing the first set of symbols based at least in part on the severity of the expected crosstalk contribution satisfying a threshold severity.

15. A method, comprising:
identifying a first set of symbols for a first multi-level signal for a first transmission line and a second set of symbols for a second multi-level signal for a second transmission line;
comparing a first voltage level difference between two adjacent symbols of the first set of symbols and a second voltage level difference between the two adjacent symbols of the second set of symbols;
determining a severity of an expected crosstalk contribution of the second multi-level signal to the first multi-level signal for the second set of symbols, wherein the severity of the expected crosstalk contribution is determined based at least in part on the comparison; and
transmitting a compensated version of the first multi-level signal during symbol periods representing the first set of symbols based at least in part on the severity of the expected crosstalk contribution satisfying a threshold severity.

16. An apparatus, comprising:
a node coupled with a transmission line between the apparatus and a memory device; and
a controller configured to cause the apparatus to:
identify a first set of symbols for a first multi-level signal and a second set of symbols for a second multi-level signal, the first and second sets of symbols associated with a pulse amplitude modulation scheme;
determine a voltage level difference for the second set of symbols for the second multi-level signal;
estimate a crosstalk contribution of the second multi-level signal to the first multi-level signal based at least in part on the voltage level difference; and
transmit, over the node, a compensated version of the first multi-level signal during symbol periods representing the first set of symbols based at least in part on the estimated crosstalk contribution.

17. The apparatus of claim 16, wherein the controller is further configured to:
determine that the voltage level difference satisfies a threshold, wherein the compensated version of the first multi-level signal is transmitted based at least in part on the voltage level difference satisfying the threshold.

18. The apparatus of claim 17, wherein the controller is further configured to:
determine a product of the voltage level difference and a coupling factor of the second multi-level signal, wherein the crosstalk contribution is estimated based at least in part on the product of the voltage level difference and the coupling factor.

* * * * *